US011675483B2

(12) United States Patent
Uemura

(10) Patent No.: US 11,675,483 B2
(45) Date of Patent: Jun. 13, 2023

(54) CLIENT DEVICE, CONTROL METHOD, AND STORAGE MEDIUM FOR SMOOTHLY EXCHANGING THE DISPLAY OF IMAGES ON A DEVICE

(71) Applicant: CANON KABUSHIKI KAISHA, Tokyo (JP)

(72) Inventor: Kiyohiro Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/002,518

(22) Filed: Jun. 7, 2018

(65) Prior Publication Data
US 2018/0373403 A1 Dec. 27, 2018

(30) Foreign Application Priority Data

Jun. 27, 2017 (JP) .............................. JP2017-125529

(51) Int. Cl.
| | |
|---|---|
| *G06F 3/048* | (2013.01) |
| *G06F 3/0483* | (2013.01) |
| *G06F 3/04845* | (2022.01) |
| *G06T 13/80* | (2011.01) |
| *G06F 3/04883* | (2022.01) |
| *G06F 3/0482* | (2013.01) |
| *G06F 3/0485* | (2022.01) |

(52) U.S. Cl.
CPC .......... *G06F 3/0483* (2013.01); *G06F 3/0482* (2013.01); *G06F 3/0485* (2013.01); *G06F 3/04845* (2013.01); *G06F 3/04883* (2013.01); *G06T 13/80* (2013.01); *G06F 2203/04806* (2013.01)

(58) Field of Classification Search
CPC .................................................. G06F 3/0483
See application file for complete search history.

(56) References Cited

U.S. PATENT DOCUMENTS

| | | | |
|---|---|---|---|
| 10,732,818 B2* | 8/2020 | Won ...................... G06F 3/0488 |
| 2003/0179189 A1* | 9/2003 | Lira ........................ G09G 1/00 |
| | | | 345/173 |
| 2009/0234667 A1* | 9/2009 | Thayne ................. H04L 63/102 |
| | | | 707/999.102 |
| 2010/0251153 A1* | 9/2010 | SanGiovanni ...... G06F 3/04842 |
| | | | 715/848 |
| 2011/0039602 A1* | 2/2011 | McNamara ........... G06F 3/0485 |
| | | | 455/566 |
| 2011/0066636 A1* | 3/2011 | Guido ................... H04L 67/146 |
| | | | 707/769 |
| 2012/0081306 A1* | 4/2012 | Sirpal ................. G06F 3/04886 |
| | | | 345/173 |
| 2013/0063383 A1* | 3/2013 | Anderssonreimer ....................... |
| | | | G06F 1/1626 |
| | | | 345/173 |
| 2013/0132889 A1* | 5/2013 | Takayasu .............. G06F 3/0485 |
| | | | 715/784 |

(Continued)

FOREIGN PATENT DOCUMENTS

JP 5911326 B2 4/2016

*Primary Examiner* — Hua Lu
(74) *Attorney, Agent, or Firm* — Canon U.S.A., Inc. I.P. Division

(57) ABSTRACT

A device's display control includes changing a second image that is in an invisible state to a visible state moving the second image changed into the visible state in a display area, and switching an image displayed in the display area from a first image to the second image.

14 Claims, 21 Drawing Sheets

(56) References Cited

U.S. PATENT DOCUMENTS

| | | | |
|---|---|---|---|
| 2013/0135215 A1* | 5/2013 | Bozarth | G06F 3/147 345/173 |
| 2013/0271482 A1* | 10/2013 | Fendley | G01C 21/3682 345/589 |
| 2013/0314446 A1* | 11/2013 | Maekawa | G06F 3/041 345/684 |
| 2014/0189558 A1* | 7/2014 | Takami | G06F 3/0486 715/767 |
| 2014/0245213 A1* | 8/2014 | Gardenfors | H04L 51/066 715/778 |
| 2014/0380247 A1* | 12/2014 | Tecarro | G06F 3/0482 715/863 |
| 2015/0121194 A1* | 4/2015 | Patten | G06F 16/9574 715/234 |
| 2015/0378525 A1* | 12/2015 | Wang | G06F 3/04883 715/765 |
| 2016/0124924 A1* | 5/2016 | Greenberg | G06F 3/1415 715/738 |
| 2017/0285933 A1* | 10/2017 | Oh | G06F 3/04847 |
| 2018/0018754 A1* | 1/2018 | Leng | G06F 3/04845 |
| 2021/0133823 A1* | 5/2021 | Burriesci | G06Q 30/0251 |

* cited by examiner

FIG.10

```
<!DOCTYPE html>
<html>
  <body>
    <style>
      .prev {                                          — 1006
        transform: translate3d(-1000px, 0px, 0px);
        transition: 1.0s ease;                         — 1001
        visibility: visible;
      }
      .current {
        transform: translate3d(0px, 0px, 0px);         — 1003
        transition: 1.0s ease;
        visibility: visible;
      }
      .next {
        transform: translate3d(1000px, 0px, 0px);      — 1004
        transition: 1.0s ease;
        visibility: visible;
      }
      .prenext {
        transform: translate3d(97%);                   — 1005

}
    </style>
    .
    .                                                  — 1002
    .
  </body>
</html>
```

FIG.18

```
<!DOCTYPE html>
<html>
  <body>
    <style>
      .far-prev {
        transform: translate3d(-2000px, 0px, 0px);        ← 1804
        transition: 1.0s ease;
        visibility: invisible;
      }
      .prev {
        transform: translate3d(-1000px, 0px, 0px);        ← 1802
        transition: 1.0s ease;
        visibility: visible;
      }
      .current {
        transform: translate3d(0px, 0px, 0px);            ← 1803
        transition: 1.0s ease;
        visibility: visible;
      }
      .next {
        transform: translate3d(1000px, 0px, 0px);
        transition: 1.0s ease;
        visibility: visible;
      }
      .prenext {
        transform: translate3d(97%);                      ← 1801
      }
    </style>
    .
    .
    .
  </body>
</html>
```

(1001 bracket spans the style block)

CLIENT DEVICE, CONTROL METHOD, AND STORAGE MEDIUM FOR SMOOTHLY EXCHANGING THE DISPLAY OF IMAGES ON A DEVICE

BACKGROUND

Field

The present disclosure relates to a client device that controls display of an image, a control method, and a storage medium.

Description of the Related Art

In recent years, as a form of executing management or various processing of business data, management or processing executed through a web server has become popular. A user can access the web server from a web browser of a client device via the Internet and browse images and documents as business data on a web page provided by the web server. Browsing forms for browsing images and documents have been diversified, and a form for browsing images and documents on a web browser through a touch operation performed on a screen of a device such as a smartphone and a tablet personal computer (PC) has also become popular. Hereinafter, a device for browsing images and documents through the touch operation is called a touch device.

Types of touch operations for browsing images and documents have also been diversified, and a method for switching pages and images through a swipe operation is provided as one type of touch operation. The swipe operation refers to an operation of swiping a screen of a touch device with a user's finger that is in contact with the screen. Japanese Patent No. 5911326 discusses an information processing apparatus in which thumbnail images corresponding to documents stored in an information processing apparatus are switched through a swipe operation (in Japanese Patent No. 5911326, the operation is described as "flick operation").

For the purpose of improving a user experience, a control method is provided that causes a fade-out animation of a current image and a fade-in animation of a next image based on a swipe operation. In the control method, images are switched while being moved consecutively. Therefore, compared to a case of a control method in which images are switched instantaneously, the user can intuitively recognize switching of desired images. Animating an image on the web browser can be realized by applying an attribute described in a cascading style sheets (CSS) format to an element that represents an image described in a hypertext markup language (HTML) format.

An attribute is additional information added to the element of the image, such as a transform property for setting movement, rotation, or transformation such as scale reduction of the image, a transition property for setting a travelling time of the image, or a visibility property for setting a display state of the image. Specifically, with respect to an image arranged in a display area, if a coordinate representing a non-display area is set to the transform property, "1.0 s" is set to the transition property, and "visible" (visible state) is set to the visibility property, it is possible to set an animation that causes the image arranged in the display area to be faded out to the non-display area in one second.

SUMMARY

According to an aspect of the present disclosure, a client device that sets an image that is not displayed in a display area of a display to an invisible state includes a memory that stores in instructions and at least one processor in communication with the memory, where when the at least one processor executes the instructions, the at least one processor functions as a determination unit configured to determine whether a user operation with respect to the display is an image switching operation for switching display of an image in the display area to display of another image, a changing unit configured to, in a case where the determination unit determines that the user operation is the image switching operation, change a second image not displayed in the display area and in an invisible state to a visible state when the second image is moved a predetermined amount or more, and a switching unit configured to switch an image displayed in the display area from a first image to the second image.

Further features will become apparent from the following description of exemplary embodiments with reference to the attached drawings.

BRIEF DESCRIPTION OF THE DRAWINGS

FIG. 10 is a diagram illustrating a part of a web image browsing program for displaying the web image browsing screen on the web browser.

FIG. 18 is a diagram illustrating a part of a web image browsing program for displaying the web image browsing screen on the web browser according to the second exemplary embodiment.

DESCRIPTION OF THE EMBODIMENTS

As a measure to reduce the amount of use area of a memory of a client device, there may be a method of not substantializing an image in a non-display area. Specifically, only an image rendered within a display area is substantialized through a software system such as a web browser, and the substantialized image is stored in a memory. An image in a non-display area is not substantialized or stored in the memory. There may be a method of placing restriction on a software system, such as a web browser, to make a visibility property of an animated image unchangeable. Substantializing the image refers to processing of setting a visibility property of a target image to "visible", while setting "invisible (invisible state)" to a visibility property of a non-substantialized image in the non-display area. As a result, if the image in the non-display area is moved to the display area using a swipe operation, the image is not displayed thereon while the image is being animated to fade in because a visibility property thereof still remains "invisible". After the fade-in animation ends, the visibility property of the image is switched to "visible", so that the image is displayed on the display area. Therefore, the user cannot see the image while it is being switched by the swipe operation, and the image is abruptly displayed in the display area after switching of the images ends. As a result, the user cannot intuitively recognize that the image is switched to a desired image.

The present disclosure is directed to a method for enabling a user to see a state while switching the images by a specific operation, such as the swipe operation, and to intuitively recognize that an image is switched to a desired image in a case where an image in the non-display area is animated to fade into the display area.

According to the present disclosure, the user can see the state in the midst of switching the images by a specific operation, such as the swipe operation, to intuitively recognize that the image is switched to the desired image in a case where the image in the non-display area is animated to fade into a display area.

Hereinafter, an exemplary embodiment embodying the present disclosure will be described with reference to practical examples.

Figure 1:
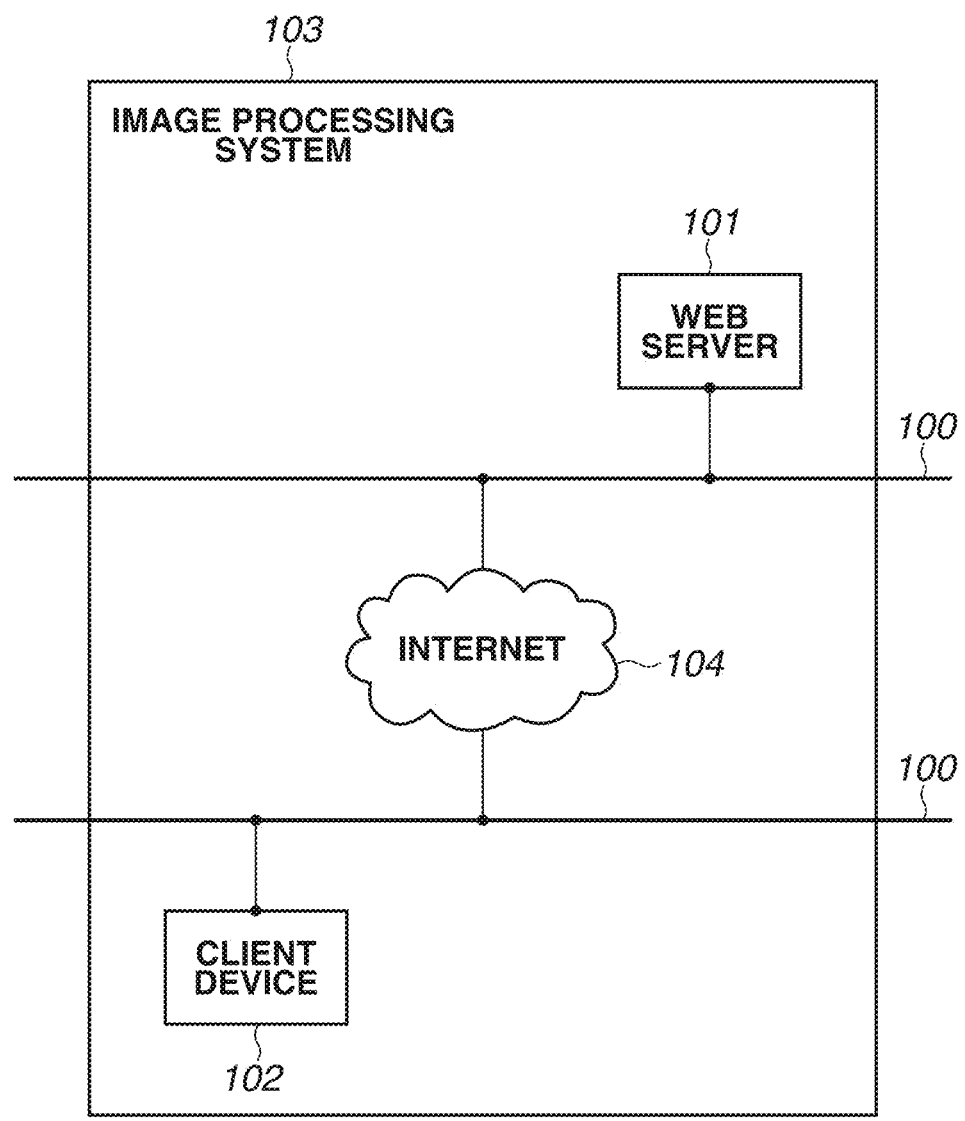
FIG. 1 is a block diagram illustrating a configuration of an image processing system according to an exemplary embodiment.

An image processing system 103 according to an exemplary embodiment will be described with reference to FIG. 1. The image processing system 103 in FIG. 1 includes a web server 101 and a client device 102, and the web server 101 and the client device 102 are connected to each other via an internet 104. The internet 104 and various devices are communicably connected to each other through a network 100. The network 100 is a local area network (LAN), a wide area network (WAN), a phone line, a dedicated digital line, an asynchronous transfer mode (ATM) network, a frame relay network, a cable television network, or a data broadcasting wireless network. The network 100 can be a communication network realized by a combination of the above-described networks, and any communication network can be used as long as transmission and receipt of data can be executed there through.

The web server 101 receives a request for executing a web image browsing program from the client device 102 via the internet 104. The web image browsing program is an application operating on a web browser, and an image can be displayed on the web browser by executing the web image browsing program. The web image browsing program is described in a file format for expressing an image on the web browser, such as hypertext markup language (HTML) and cascading style sheets (CSS), or programming language (e.g., JavaScript™ operating on the web browser. Hereinafter, a screen display displayed on the web browser through execution of the web image browsing program is called as a web image browsing screen, and an HTML file or a CSS file that constitutes the web image browsing program is referred to as an image file. The image file can consist of one or more files.

The web image browsing program can be a form that operates on a computer system such as an operating system (OS) of the client device 102 in addition to the form that operate on the web browser. Alternatively, the web image browsing program can be a form in which the web server 101 generates only an image file, and the web browser of the client device 102 displays the web image browsing screen by using the generated image file.

The client device 102 is a touch device, such as a smartphone or a tablet PC, and uses a web browser to execute the web image browsing program received from the web server 101.

Figure 2:
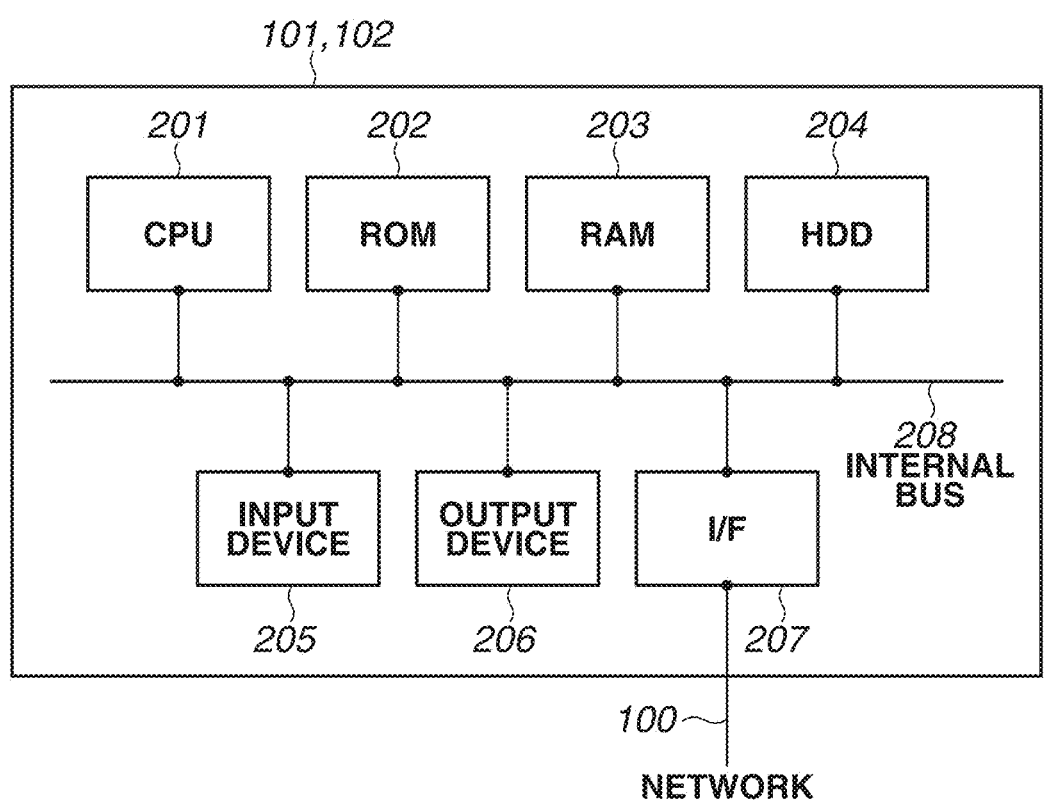
FIG. 2 is a block diagram illustrating an internal configuration of a web server and a client device constituting the image processing system.

Next, internal configurations of the web server 101 and the client device 102 of the image processing system 103 illustrated in FIG. 1 will be described with reference to the block diagram of FIG. 2. Basic structures of internal configurations included in the web server 101 and the client device 102 are similar to each other. In FIG. 2, while the client device 102 will be described as an example, the same description applies to the web server 101.

A central processing unit (CPU) 201 executes a program read from a read only memory (ROM) 202 or a random access memory (RAM) 203 to execute control of the client device 102. The CPU 201 executes this program to realize processing illustrated in sequence diagrams or flowcharts described below. The CPU 201 controls respective blocks connected to an internal bus 208.

The ROM 202 is a storage device storing embedded programs including an application program, such as a basic input/output system (BIOS), an OS, and data. The BIOS is a program for controlling a peripheral device connected to the client device 102.

The RAM (direct storage device) 203 is a work memory used when the CPU 201 executes a program. A program stored in the ROM 202 is loaded in the RAM 203, and the CPU 201 sequentially reads and executes the program.

A hard disk drive (HDD) 204 is an external storage device storing an OS or software modules, and an indirect storage device, such as a solid-state drive (SSD) can be used in place of the HDD 204.

The input device 205 is connected to a below-described display of the client device 102, and detects a gesture, such as a touch operation, performed on the display. The output device 206 displays a web image browsing screen on the display connected thereto. The input device 205 and the output device 206 do not have to be separate devices, and a device, such as a touch screen display, integrally configured of an input device and an output device can also be used. In the present exemplary embodiment, a touch screen display integrally configured of an input portion connected to the input device 205 and an output portion of the output device 206 will be described as an example.

An interface (I/F) 207 is connected to the network 100, and inputs or outputs information to or from the client device 102 via the network 100.

After the client device 102 is activated, control of the client device 102 is executed through the above-described hardware elements. In other words, the CPU 201 executes the BIOS stored in the ROM 202, loads the OS or the control program stored in the HDD 204 to the RAM 203, and executes control of the client device 102 based on the loaded program. In addition, unless otherwise specified, the CPU 201 plays a main role of the client device 102 or the web server 101 in terms of the hardware, whereas an application program installed in the HDD 204 plays a main role thereof in terms of the software.

Figure 3:
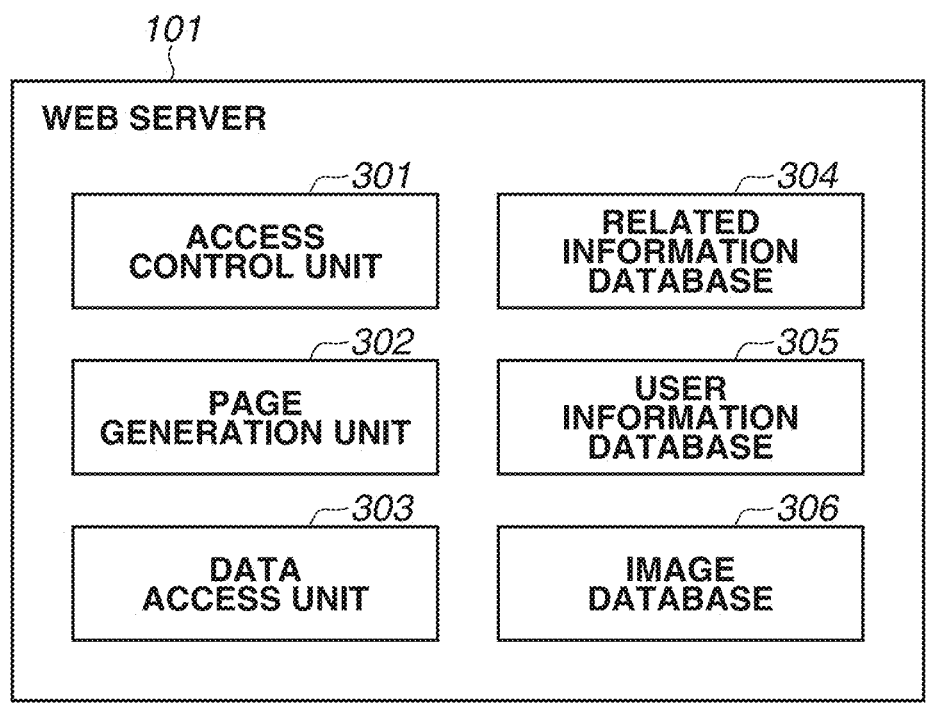
FIG. 3 is a block diagram illustrating functions included in the web server.

Functions included in the web server 101 will be described with reference to FIG. 3. The web server 101 includes an access control unit 301, a page generation unit 302, a data access unit 303, a related information database 304, a user information database 305, and an image database 306.

The access control unit 301 is a function for executing user authentication for authenticating a user attempting to log-in based on a request from the client device 102. The page generation unit 302 includes a function of generating an image file for creating a web image browsing screen and returning a generated image file to the client device 102 as a response.

The data access unit 303 transmits and receives data to and from the related information database 304, the user information database 305, and the image database 306. The related information database 304 is a function for storing the related information. The related information is association information in which identification information (e.g., image name) for identifying an image and user information (e.g., user ID) are associated with each other. By using the related information stored in the related information database 304, an image browsable by the user logging into the client device 102 can be specified. The user information database 305 is a function for storing the user information, such as a user ID, for identifying the user. The image database 306 is a function for storing images.

Figure 4:
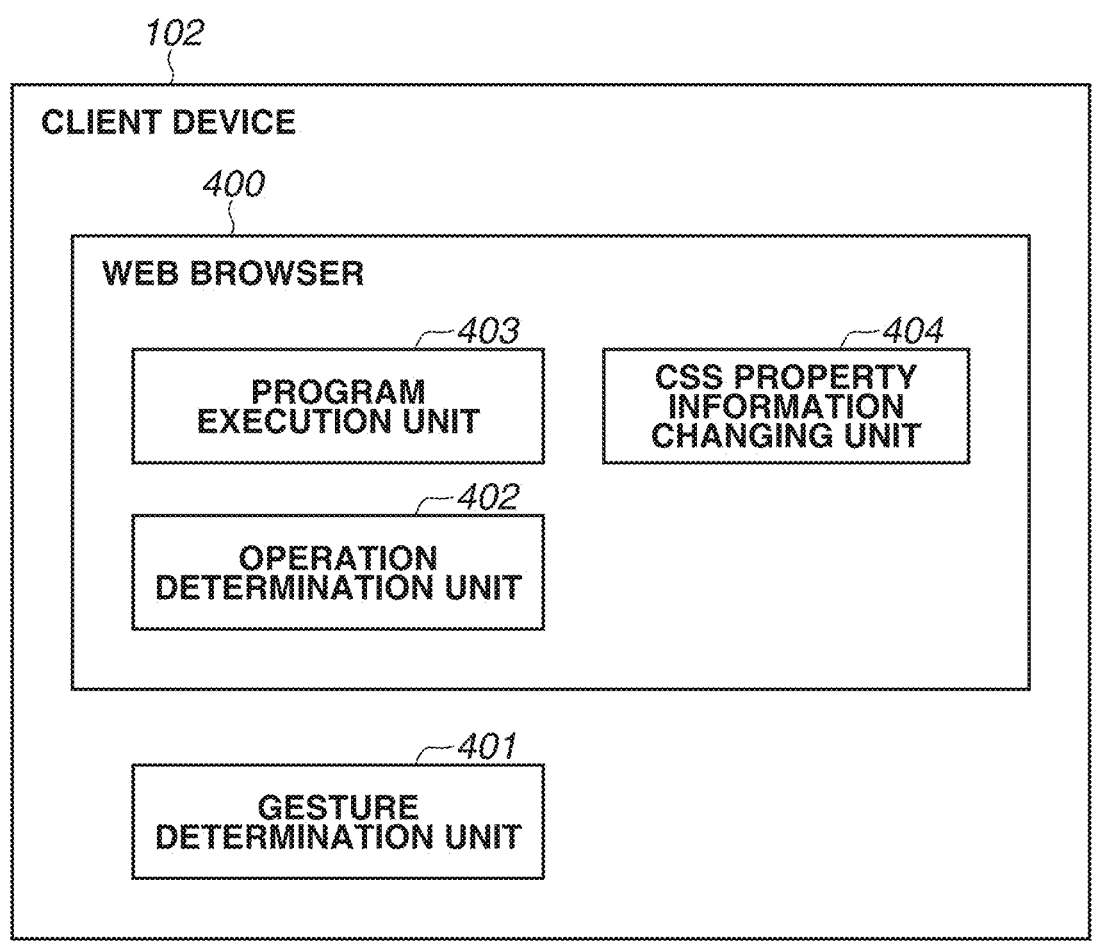
FIG. 4 is a block diagram illustrating functions included in the client device.

Functions included in the client device 102 will be described with reference to FIG. 4. The client device 102 includes a web browser 400 and a gesture determination unit 401. The web browser 400 receives an image file from the page generation unit 302 and displays a web image browsing screen on a display serving as the output device 206 based on a user operation.

The input device 205 receives the touch gesture information from the display 501 of the client device 102 (see FIGS. 5A to 5C), and the gesture determination unit 401 determines whether the image switching operation is executed based on the received touch gesture information. The touch gesture information is position information of a touched portion of the display 501, which is different from the gesture information described below. The gesture information is information indicating an operation content such as "left swipe" or "right swipe". In the present exemplary embodiment, while a swipe operation is described as the image switching operation, the image switching operation can be an operation other than the swipe operation as long as images of the web browser 400 can be switched thereby.

A flick operation or a tap operation can be considered in addition to the swipe operation.

The web browser 400 includes an operation determination unit 402, a program execution unit 403, and a CSS property information changing unit 404. The operation determination unit 402 determines the content of the user operation performed on the web browser 400 based on the gesture information received from the gesture determination unit 401. More specifically, if the gesture information received from the gesture determination unit 401 is "left swipe", the operation determination unit 402 determines the operation content as an "operation of switching an image to a next image". If the received gesture information is "right swipe", the operation determination unit 402 determines the operation content as an "operation of switching an image to a previous image". The operation determination unit 402 transmits the operation information to the program execution unit 403. The operation information is a determination result acquired by the operation determination unit 402. In the above-described specific example, the operation information is information indicating the operation content, such as an "operation of switching an image to a next image" or an "operation of switching an image to a previous image".

The program execution unit 403 controls display of the web image browsing screen based on the image file received from the page generation unit 302 and the operation information received from the operation determination unit 402. The CSS property information changing unit 404 changes a part of the received CSS property information. More specifically, the CSS property information changing unit 404 is a function of changing a visibility property of the received image file set by the CSS to "visible" or "invisible". Changing a property refers to processing of rewriting a setting value of the visibility property or processing of changing an attribute applied to the target image described in the web image browsing program (FIGS. 10 and 18). In the exemplary embodiment described below, while an exemplary embodiment in which the web browser 400 includes the CSS property information changing unit 404 will be described, the exemplary embodiment is not limited thereto. In addition to the web browser 400 operating on the OS viewer software other than the web browser 400 operating on the OS can include a function similar to that of the CSS property information changing unit 404.

In the above description, the functions included in the web server 101 and the client device 102 have been described. In addition, transmission and receipt of information (e.g., image data or program data) between the web server 101 and the client device 102 is executed between the communication units of the web browser 400 and the client device 102 (not illustrated in FIGS. 3 and 4). In the exemplary embodiments described below, "Web browser 400" or "client device 102" will be used as a subject of a sentence instead of "communication unit" as a subject thereof.

Figure 5A:
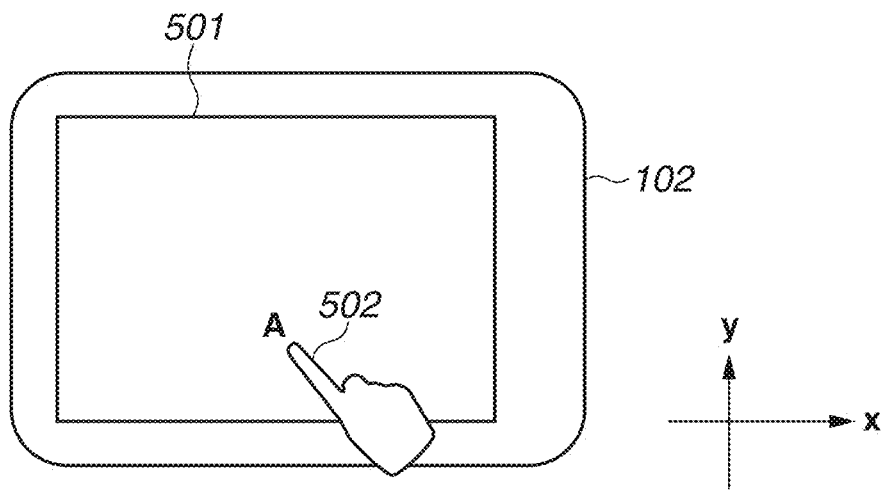
FIGS. 5A, 5B, and 5C are conceptual diagrams of touch gesture information.
Figure 5B:
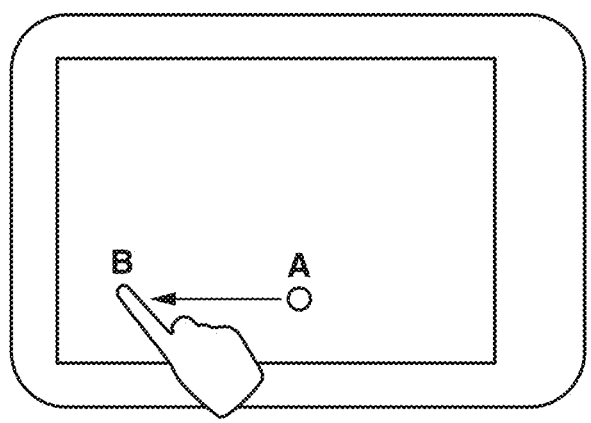
Figure 5C:
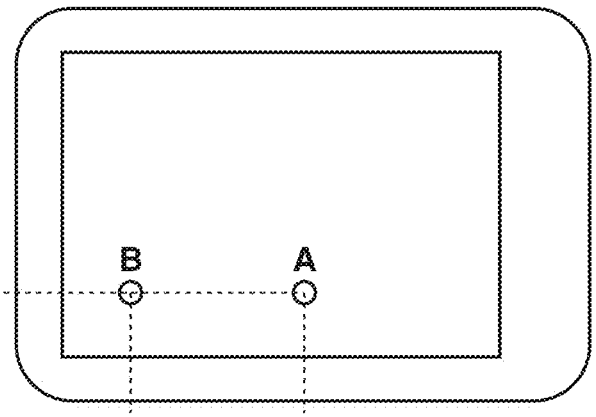

A relationship between the touch gesture information and the gesture information will be described with reference to FIGS. 5A, 5B, and 5C. FIGS. 5A, 5B, and 5C are diagrams illustrating a state where the user swipes the display 501 of the client device 102 with the user's finger 502. The user places the user's finger 502 at a starting point A (x1, y1) on the display 501 (FIG. 5A), and moves the user's finger 502 to the left from the starting point A to an ending point B (x2, y2) within a certain period in a state where the user's finger 502 is in contact with the display 501 (FIG. 5B). The gesture determination unit 401 acquires the touch gesture information (i.e., information about continuous movement from the coordinates of the starting point A to the coordinates of the ending point B) to determine that left swipe is performed if a difference value (x1−x2) exceeds a certain threshold value. If a difference value (x2−x1) exceeds the certain threshold value, the gesture determination unit 401 determines that right swipe is performed. Then, the gesture determination unit 401 transmits the operation content ("left swipe" or "right swipe") as a determination result of the gesture determination unit 401 to the operation determination unit 402 as the gesture information.

In the present exemplary embodiment, while presence or absence of the swipe operation is determined based on the moving distance of the finger 502 in the x-direction (i.e., a lateral direction of the display 501), this is not seen to be limiting. Presence or absence of the swipe operation can be determined based on the moving distance of the user's finger 502, and in a case where presence or absence of the swipe operation in a longitudinal direction is determined, a moving distance of the user's finger 502 in the y-direction (i.e., a longitudinal direction of the display 501) can be used as a criterion. Thus, the criterion or the determination method used by the gesture determination unit 401 can be changed based on the arrangement of images or the operation content with respect to the display 501.

In a first exemplary embodiment, processing of presenting a state in the midst of switching images through the image switching operation to the user when the image in the non-display area is animated to fade in the display area will be described.

Figure 6:
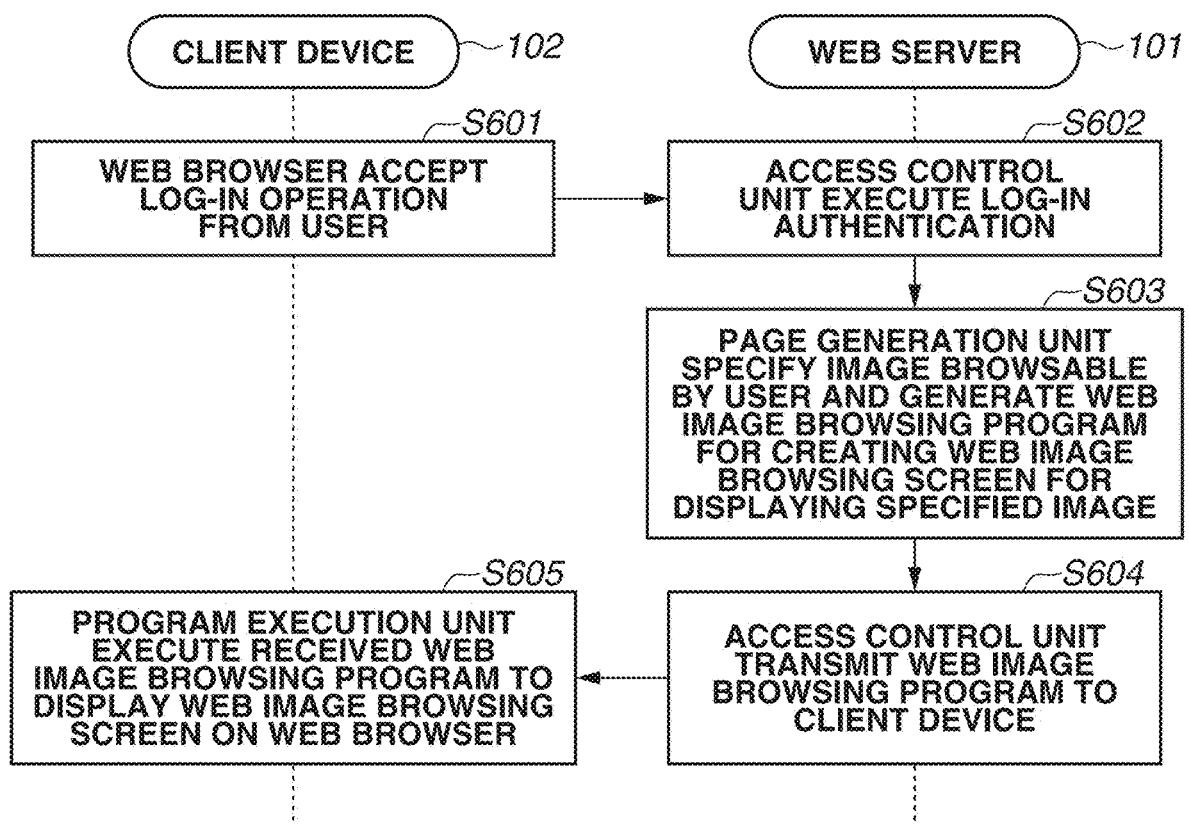
FIG. 6 is a sequence diagram illustrating processing of displaying a web image browsing screen that can be browsed by an authenticated user on a web browser.

Processing of displaying the web image browsing screen browsable by the authenticated user on the web browser 400 will be described with reference to FIG. 6. FIG. 6 is a sequence diagram illustrating processing of generating the web image browsing screen.

Figure 7:
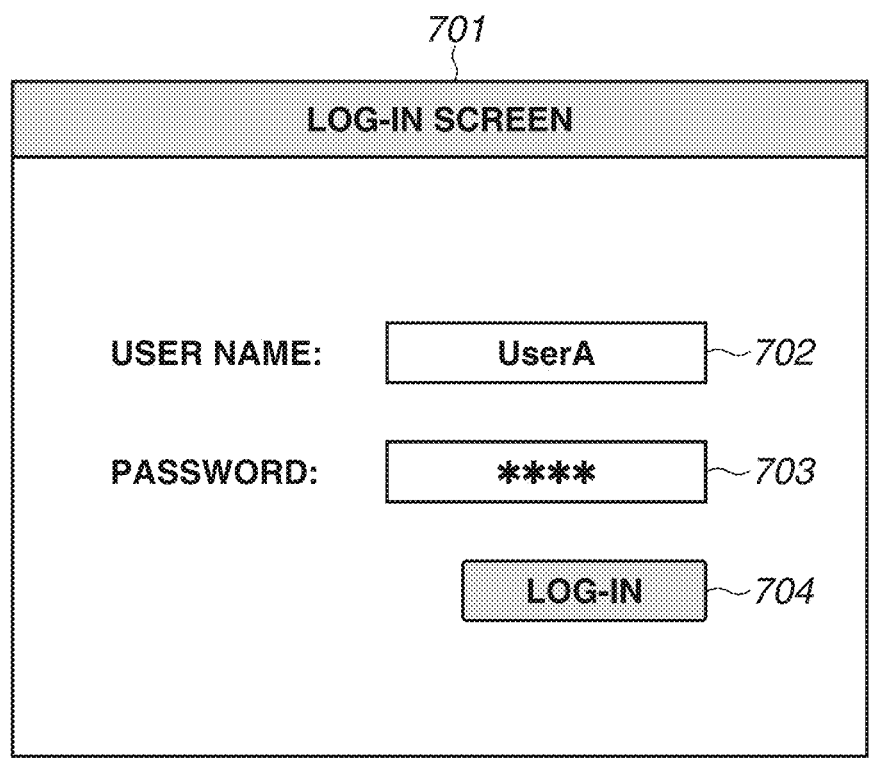
FIG. 7 is a diagram illustrating a log-in screen of the web browser.

In step S601, the web browser 400 accepts a log-in operation from the user. An example of the log-in screen displayed on the web browser 400 is illustrated in FIG. 7. The user inputs a user name and a password to a user name input text box 702 and a password input text box 703 and presses a log-in button 704 on the log-in screen 701. When the log-in button 704 is pressed, the web browser 400 transmits a request for authenticating the user to the access control unit 301.

In step S602, after receiving the request from the web browser 400, the access control unit 301 executes log-in authentication based on the content of the request received from the client device 102. More specifically, the access control unit 301 compares the user information received from the web browser 400 with the user information (i.e., a user name and a password) previously stored in the user information database 305, and determines whether the user information is valid and conforms to the pre-stored user information. If the user information is determined to be valid (YES in step S602) the processing proceeds to step S603. If the user information is determined to be invalid (NO in step S602), an error is transmitted to the web browser 400 and the processing ends.

Figure 8A:
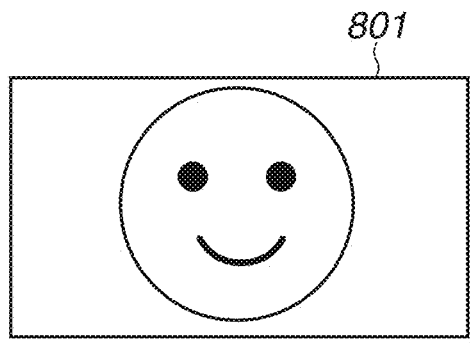
FIGS. 8A and 8B are diagrams illustrating images that can be browsed by a user.
Figure 8B:
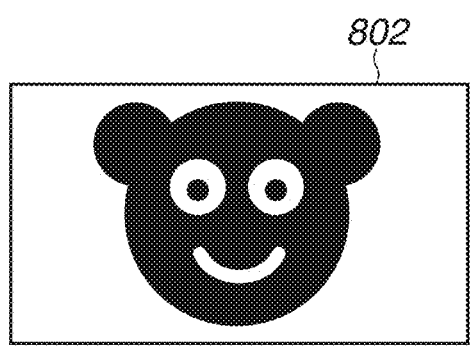

After the user has been authenticated in step S602, in step S603, based on the user information and the related information stored in the related information database 304, the page generation unit 302 specifies images browsable by the user from the image data stored in the image database 306, and generates the web image browsing program for creating the web image browsing screen for displaying the specified images. More specifically, if the images browsable by the user are an image 801 (FIG. 8A) and an image 802 (FIG. 8B) in a scalable vector graphics (SVG) format, the page generation unit 302 generates a web image browsing program for creating a web image browsing screen 803 (FIG. 8C) for displaying the two images 801 and 802. The images do not have to be in the SVG format, but can be in another format, such as the portable network graphics (PNG), the joint photographic experts group (JPEG), or the graphics interchange format (GIF). A display order of the image can be determined based on an image generation date/time or an image name. The web image browsing program is configured of an HTML, a CSS, or a JavaScrip™ program, and image display control of an image and switching control of switching the images to be displayed on the web image browsing screen 803 can be executed.

Figure 8C:
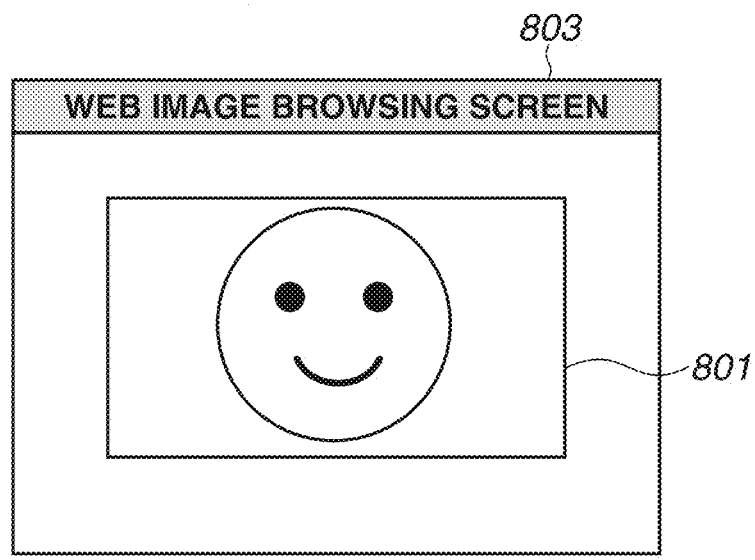
FIG. 8C is a diagram illustrating a web image browsing screen on which an image is displayed.

In step S604, the access control unit 301 transmits the web image browsing program generated in step S603 to the client device 102. In step S605, the program execution unit 403 of the client device 102 executes the web image browsing program received in step S605 and displays the web image browsing screen 803 on the web browser 400. At this time, for example, the web image browsing screen 803 as illustrated in FIG. 8C is displayed.

Figure 9:
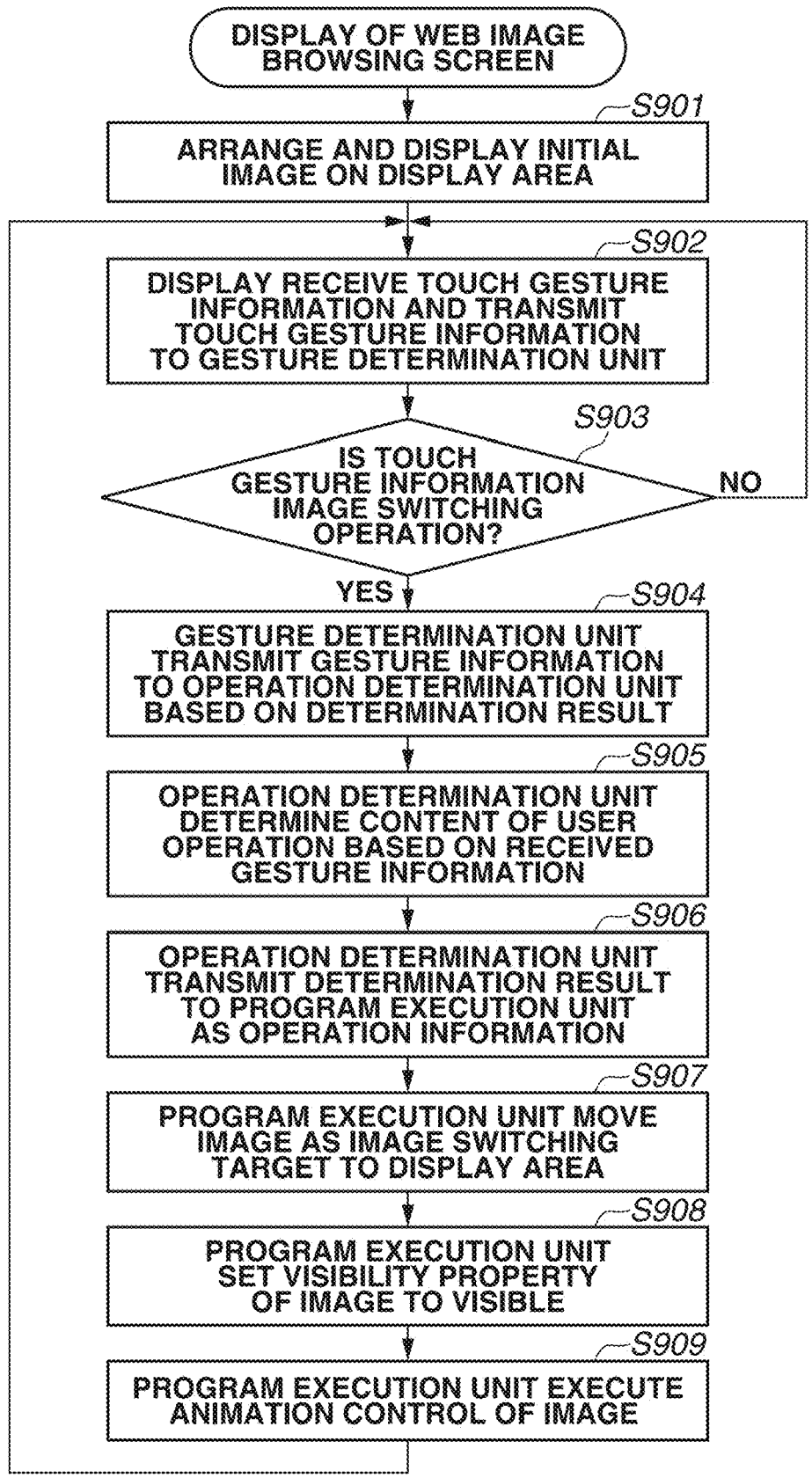
FIG. 9 is a flowchart illustrating processing of switching the web image browsing screen displayed on the web browser through an image switching operation.

Next, processing of switching the web image browsing screen 803 displayed in step S605 through the image switching operation will be described with reference to FIGS. 9 and 10. FIG. 9 is a flowchart illustrating the processing of switching the web image browsing screen 803 displayed on the web browser 400 through the image switching operation. The processing in FIG. 9 is started when the program execution unit 403 receives the web image browsing program. FIG. 10 is a diagram illustrating a part of the HTML, the CSS, and the JavaScript™ programs constituting the web image browsing program for displaying the web image browsing screen 803 on the web browser 400.

First, the content described in the web image browsing program will be described with reference to FIG. 10. A property and a setting value of the CSS are described in a definition portion 1001 between "<Style>" tags. Then, the program execution unit 403 applies the described content of the property of the definition portion 1001 to each element of the HTML images in the present exemplary embodiment (not illustrated in FIG. 10) to execute animation control. Specifically, for example, a moving position, a moving time, and a display state of an image are set by the respective properties of "transform", "transition", and "visibility".

With respect to the definition portion 1001, an attribute 1003 is applied to an image displayed in the display area, an attribute 1006 is applied to a previous image of the image displayed in the display area, an attribute 1004 is applied to a next image of the image displayed in the display area, and an attribute 1005 is applied to the next image in order to make a part of the image enter the display area when the next image is to be displayed in the display area.

The program execution unit 403 can apply the property to the image set by the HTML through a method of statically making a definition on the HTML, or a method of dynamically making a definition by using the JavaScript™ (not illustrated in FIG. 10). The HTML or the JavaScript™ can be directly described in an omitted portion 1002, or a program stored externally can be read by the program execution unit 403.

Figure 11A:
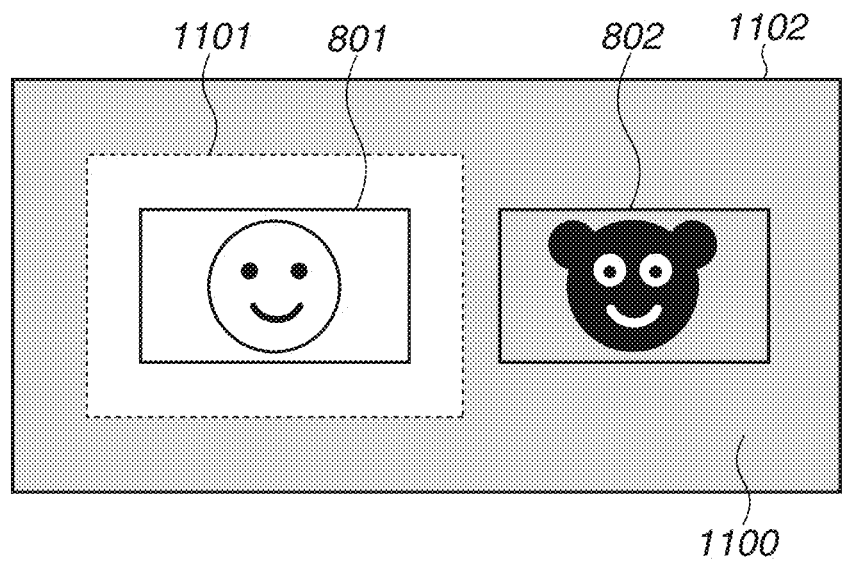
FIGS. 11A, 11B, and 11C are conceptual diagrams illustrating arrangement of images in a display area and a non-display area.
Figure 11B:
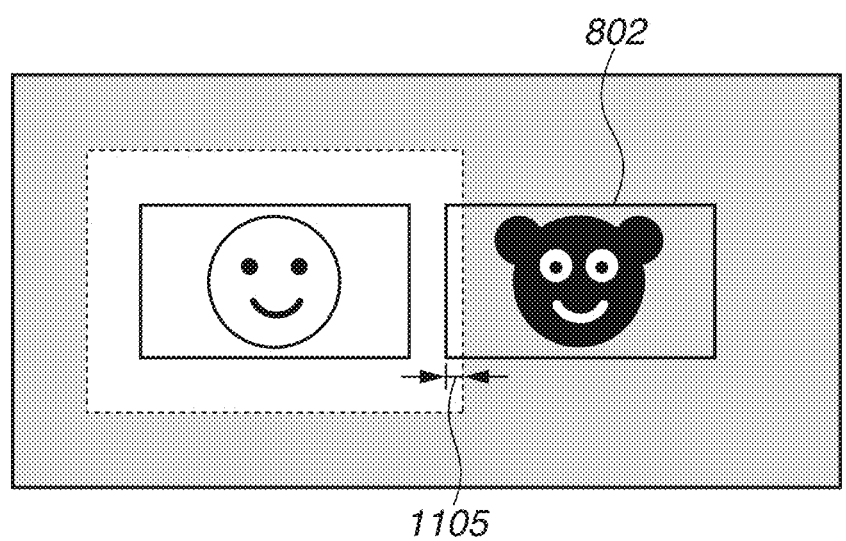
Figure 11C:
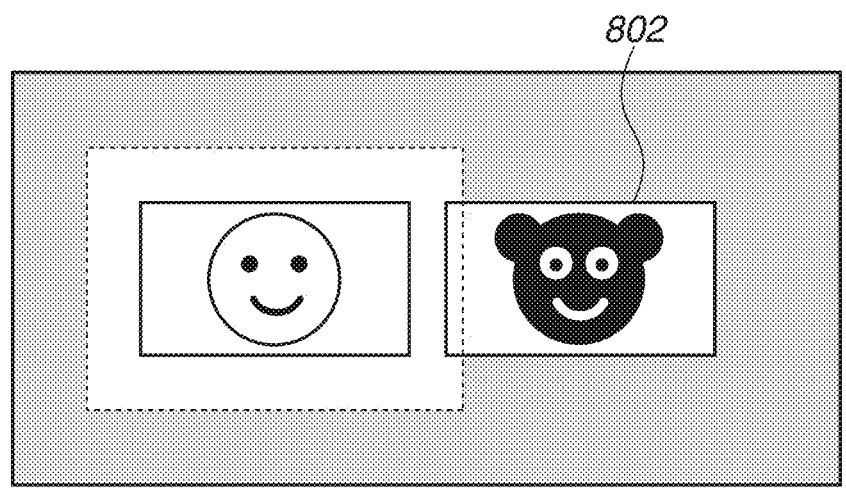

Next, processing of switching the web image browsing screen 803 through the image switching operation will be described with reference to FIG. 9, FIGS. 11A to 11C, and FIGS. 12A to 12F. FIGS. 11A, 11B, and 11C are conceptual diagrams illustrating arrangement of the images 801 and 802 in a display area 1101 and a non-display area 1100 (shaded portions in FIGS. 11A to 11C) of the screen of the client device 102, and an object area 1102 is realized by the web image browsing program. FIGS. 12A to 12F are diagrams illustrating an example of the web image browsing screen 803 when the images are moved by the image switching operation. The processing illustrated in FIG. 9 will be described with reference to FIGS. 11A to 11C and FIGS. 12A to 12F.

Figure 12A:
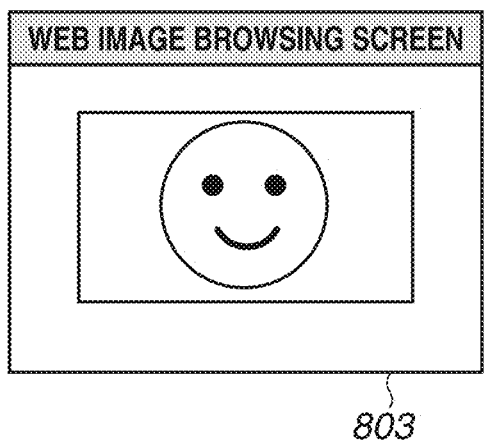
FIGS. 12A, 12B, 12C, 12D, 12D, 12E, and 12F are diagrams of a web image browsing screen illustrating a state where images are moved by the image switching operation.
Figure 12D:
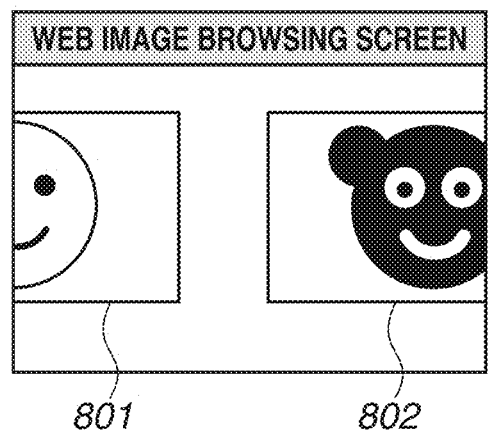

After the program execution unit 403 acquires the web image browsing program in step S605, in step S901, the program execution unit 403 arranges and displays an initial image in the display area 1101. In the present exemplary embodiment, the image 801 is displayed as the initial image, and an example of the web image browsing screen 803 in the above-described state is illustrated in FIG. 12A. Images in the display area 1101 and the non-display area 1100 are illustrated in the conceptual diagram in FIG. 11A. The image 801 in the display area 1101 is in a rendered state, whereas the image 802 in the non-display area 1100 is in a non-rendered state.

The web image browsing program for realizing a state in step S901 will be described with reference to FIG. 10. The program execution unit 403 applies a visibility property described in the attribute 1003 to the image 801. Because the property is set as "visibility: visible" in the attribute 1003, the image 801 to which the attribute 1003 is applied is rendered in the web browser 400. The program execution unit 403 applies a visibility property described in the attribute 1004 to the image 802. While the property is set as "visibility: visible" in the attribute 1004, restriction for reducing use area of the memory of the client device 102 is placed on the web browser 400 operating on the OS. For this reason, with respect to the image 802 in the non-display area 1100, the visibility property of the attribute 1004 is changed to "invisible" by the CSS property information changing unit 404 regardless of the described content of the web image browsing program. As a result, the image 802 to which the attribute 1004 is applied is not rendered in the web browser 400.

After the initial image is displayed in the display area 1101 in step S901, in step S902, touch gesture information received by the display 501 is transmitted to the gesture determination unit 401. In step S903, the gesture determination unit 401 receives the touch gesture information and determines whether the touch gesture information is the image switching operation. If the gesture determination unit 401 determines that the touch gesture information is the swipe operation (YES in step S903), the processing proceeds to step S904. If the gesture determination unit 401 determines that the touch gesture information is not the image switching operation (NO in step S903), the processing returns to the previous stage of step S902 where the display 501 can receive the touch gesture information again.

In step S903, if the gesture determination unit 401 determines that the touch gesture information is the image switching operation (YES in step S903), the processing proceeds to step S904. In step S904, based on the determination result in step S903, the gesture determination unit 401 transmits the gesture information to the operation determination unit 402. Herein, the gesture information is assumed to be "left swipe".

In step S905, the operation determination unit 402 determines the content of the user operation based on the received gesture information. Herein, it is assumed that the content of the user operation is determined as "operation of switching an image to a next image" based on the gesture information "left swipe". In step S906, the operation determination unit 402 transmits the determination result in step S905 to the program execution unit 403 as the operation information.

After receiving the operation information from the operation determination unit 402, in step S907, the program execution unit 403 moves the image 802 that is an image switching target to the display area 1101. An example of arrangement of the images in the object area 1102 after moving the image 802 is illustrated in FIG. 11B. At this point, because the visibility property of the image 802 is "invisible", similar to the state in FIG. 11A, only the image 801 is displayed in the display area 1101.

A web image browsing program for realizing the state in step S907 will be described with reference to FIG. 10. When the program execution unit 403 receives the operation information indicating the image switching operation in step S906, the program execution unit 403 applies the attribute 1005 of the web image browsing program to the image 802. The property of the attribute 1005 "transform: translate3d (97%)" causes the image 802 to be moved to a position corresponding to "97%" when a left end position and a right end position of the display area 1101 are defined as "0%" and "100%" respectively. In the present exemplary embodiment, whether the image has entered the display area 1101 is determined based on the width of the image. However, the determination can be made based on the area of the image. A definition method of the transform property for instructing the movement of the image 802 is not limited to the method illustrated in FIG. 10, and a method of expressing the display area 1101 by using coordinates and specifying movement of the image 802 by using the coordinates can be also considered.

In the present exemplary embodiment, while the transform property is set to 97% when a prenext attribute is applied to the image, a setting value thereof is not limited thereto. It is assumed that, due to the characteristics of the web browser 400 operating on the OS, the visibility property cannot be set to "visible" in step S908 described below because the image 802 cannot be exempted from the restriction placed on the web browser 400 unless the lateral axis of the image 802 in the display area 1101 is 1% or more of the lateral axis of the display area 1101. In such a case, a value of the transform property has to be set to make the lateral axis of the image 802 in the display area 1101 exceed 1% of the lateral axis of the display area 1101.

Figure 12B:
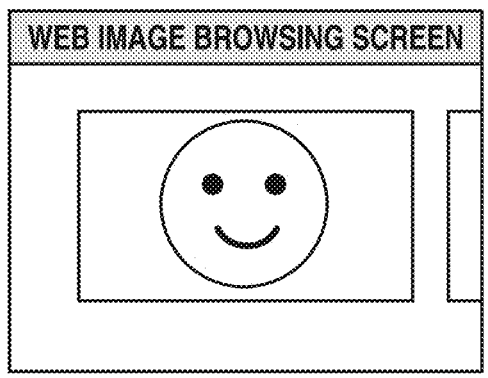
Figure 12E:
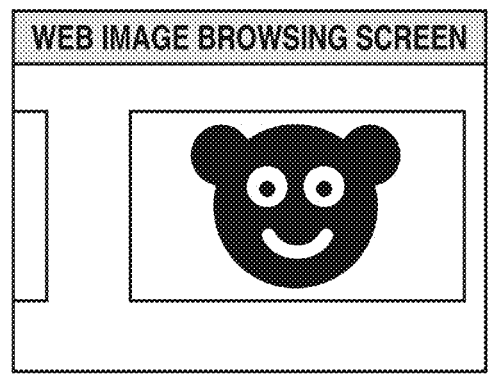
Figure 12C:
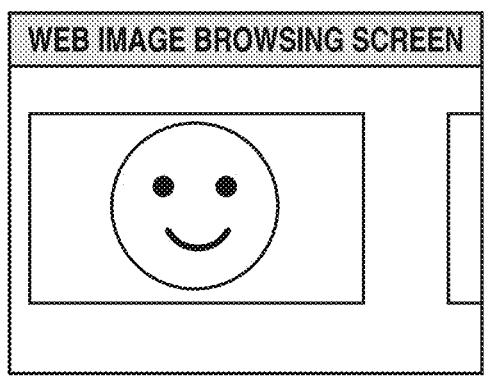
Figure 12F:
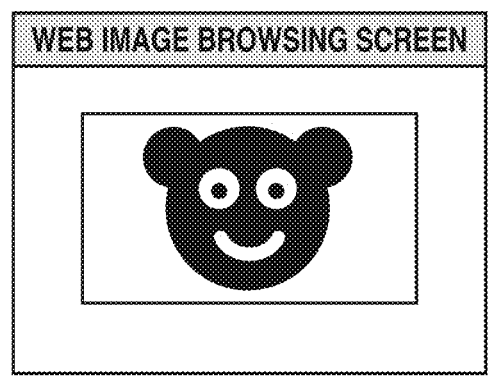

In step S908, after moving the image 802 to the display area 1101, the program execution unit 403 sets the visibility property of the image 802 to "visible". In the present exemplary embodiment, it is assumed that the visibility property and its setting value "visible" are set dynamically because the visibility property is not set in the attribute 1005. However, it is not limited thereto. The visibility property and its setting value of the attribute 1005 can be previously set by the web image browsing program, and the web image browsing program can be described in any method as long as the image 802 is brought into a visible state after being moved to the display area 1101. As a result of the processing in step S908, a certain area 1105 that has entered the display area 1101 is rendered in the web browser 400. Examples of a display screen in the above state are illustrated in FIGS. 11C and 12B.

The certain area 1105 is a width of a portion of the image 802 that has entered the display area 1101, corresponding to a length indicated by an arrow in FIG. 11B. In the present exemplary embodiment, while a direction in which the image 802 enters the display area 1101 is a right/left direction, it is not limited thereto. A direction in which the image 802 enters can be an up/down direction or an oblique direction. If the entering direction is the up/down direction, the certain area 1105 can be defined by a length or an area of the portion of the image that has entered the display area 1101. If the above entering direction is the oblique direction, the certain area 1105 can be defined by a length of any one of the sides or the area of the image that has entered the display area 1101.

In step S909, the program execution unit 403 executes animation control of the images 801 and 802. Specifically, based on the content of the web image browsing program (FIG. 10), the program execution unit 403 applies the attribute 1006 to the image 801 and executes fade-out animation control. The program execution unit 403 applies the attribute 1003 to the image 802 and executes fade-in animation control. In the present exemplary embodiment, with respect to the image 802, a coordinate (0 px, 0 px, 0 px) representing the center of the display area 1101 is set to the transform property, "1.0 s" is set to the transition property, and "visible" is set to the visibility property of the attribute 1003. Therefore, the image 802 can be faded into the center of the display area 1101 in one second through the fade-in animation.

With respect to the image 801, a coordinate (−1000 px, 0 px, 0 px) representing the non-display area 1100 is set to the transform property, "1.0 s" is set to the transition property, and "visible" is set to the visibility property of the attribute 1006. Therefore, the image 801 can be faded out to the non-display area 1100 in one second through the fade-out animation. FIGS. 12C to 12F illustrate a state where the web image browsing screen 803 is switched from the image 801 to the image 802.

Through the above-described processing of the present exemplary embodiment, for example, when the web image browsing screen 803 is switched through the image switching operation, such as the swipe operation, the user can intuitively recognize that the image is switched to a desired image because the next image is displayed in the display area 1101 through the fade-in animation.

In a second exemplary embodiment, a method of switching the images through the image switching operation when a focus mode is employed will be described. In the focus mode, only a pre-registered image is displayed in an enlarged state if the user previously registers the image to be displayed in an enlarged state and switches the image through the image switching operation when the focus mode is being executed.

According to the present exemplary embodiment, a state in the midst of switching the images through the image switching operation to the user when the images are switched during execution of the focus mode is presented, thus enabling the user to intuitively recognize that the image is switched to a desired image. The processing for realizing this purpose will be described. A configuration that is not described in the present exemplary embodiment is similar to the configuration described in the first exemplary embodiment. The same reference numerals are applied to the components described in the first exemplary embodiment, and detailed descriptions thereof will be omitted.

Similar to the first exemplary embodiment, while the swipe operation will be described as the image switching operation, the image switching operation can be an operation other the swipe operation as long as images of the web browser 400 can be switched thereby. In addition to the swipe operation, another operation mode of switching the images, e.g., the flick operation or the tap operation, can be also considered.

Figure 13:
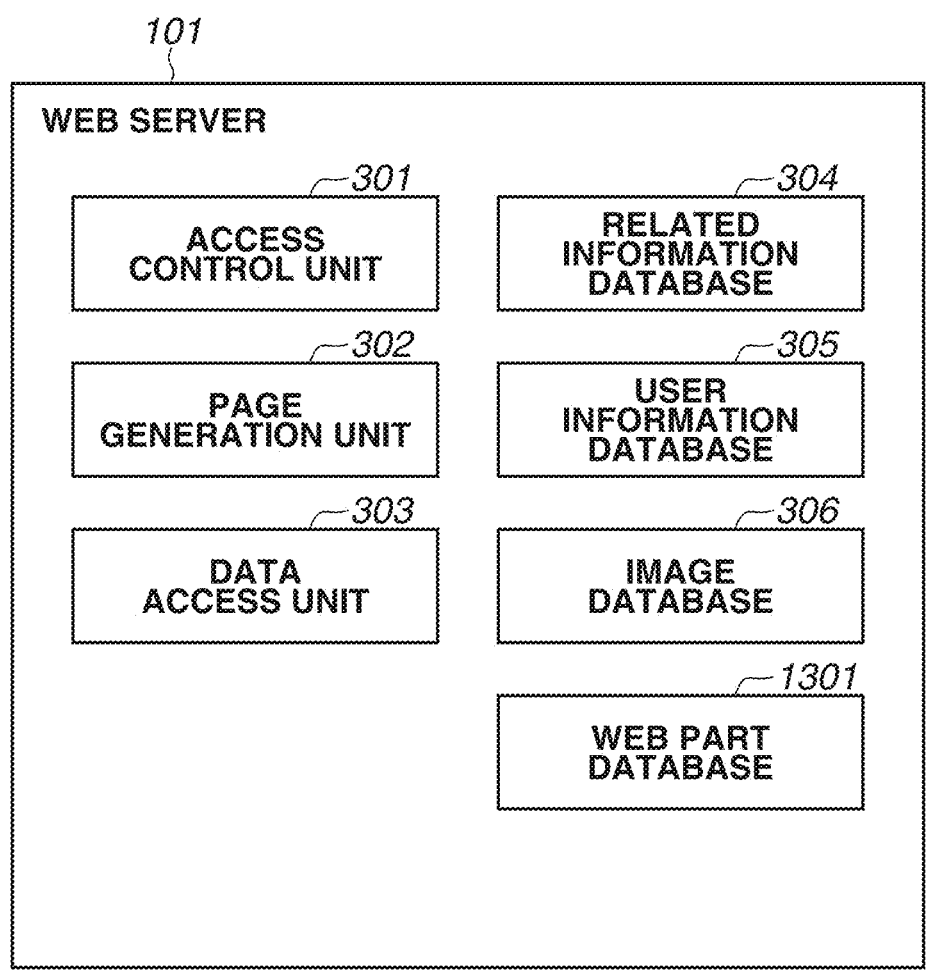
FIG. 13 is a block diagram illustrating functions included in the web server.

First, functions included in a web server 101 of the present exemplary embodiment will be described with reference to FIG. 13. A data access unit 303 executes accessing processing with respect to databases 304, 305, 306, and 1301. The related information database 304 is a database storing related information, and the related information in the present exemplary embodiment includes information for specifying an image, user information of the user who can browse the image, and web part information associated to each other. The web part database 1301 is a database storing web part information. In the present exemplary embodiment, while association information of the web part information and information for specifying an image is managed in the related information database 304, the association information can be managed in the web part database 1301, and the association information can be managed in any part of the web server 101 as long as the web part information and the information for specifying the image are associated with each other.

The web part can be a user interface (UI) such as a button used for executing an optional function provided to the user when the web image browsing screen 803 is displayed, and a focus button is provided to the user as a web part used for the focus mode. The web part information includes a program file for executing the function of the web part and arrangement information of buttons used for executing the function of the web part in the web image browsing screen 803.

The focus button is displayed in a state of being superimposed on a specific image, and a pre-registered image is displayed in an enlarged state when the user presses the focus button. The enlarged image returns to the original state before being enlarged when the focus button is pressed again, and the focus mode is released. If the user swipes the web image browsing screen 803 when the focus mode is being activated, a display image is switched to another previously registered image.

The user has to execute prior setting when the function of the web part is used. As an example of the prior setting, there is provided a method in which the user selects an image as an execution target of the function of the web part in the web part generation screen (not illustrated), so that association information in which the selected image is associated with the web part information is registered in the related information database 304 via the data access unit 303.

Figure 14:
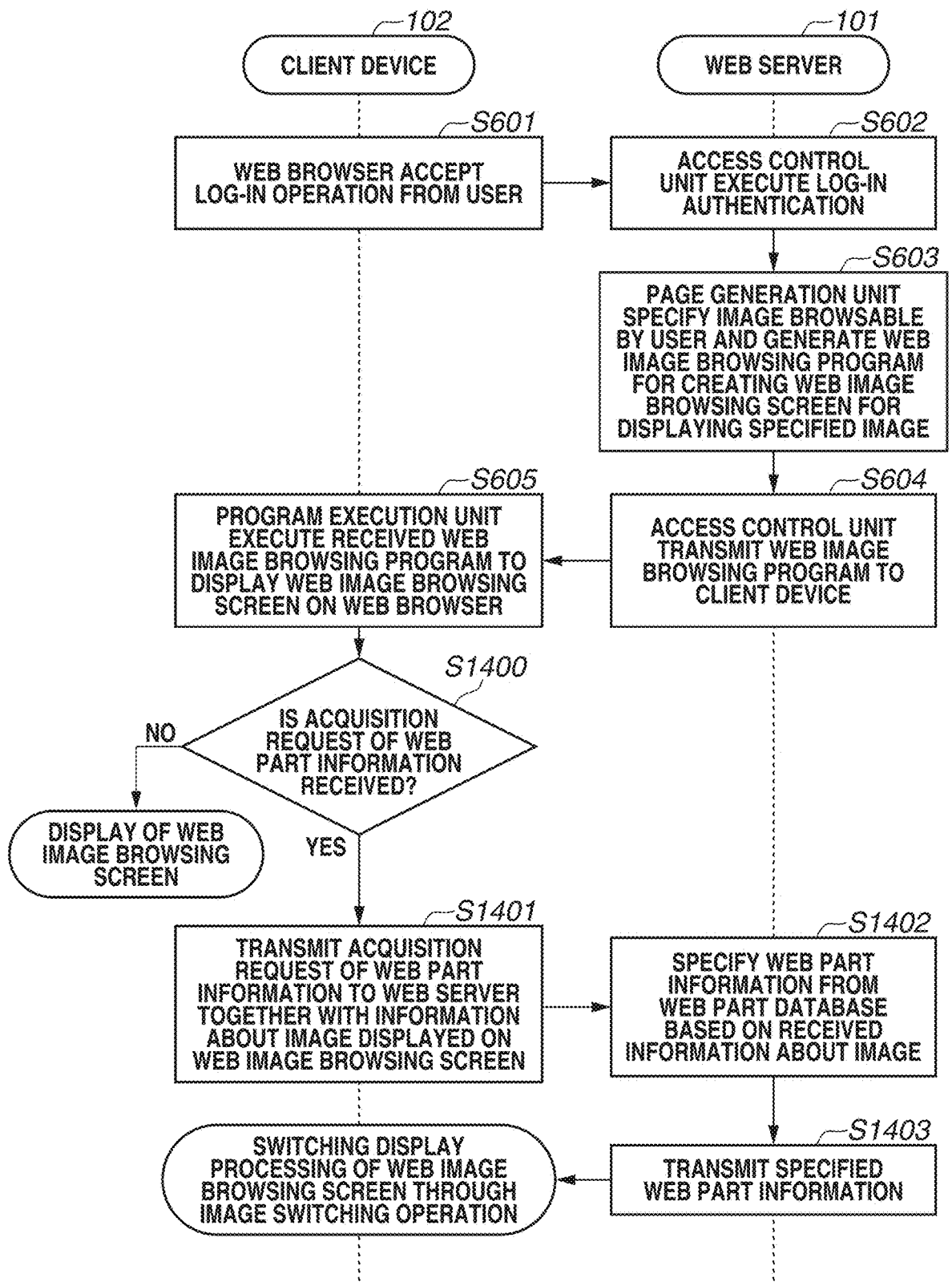
FIG. 14 is a flowchart illustrating processing of generating a web image browsing screen using a web part according to a second exemplary embodiment.

The processing of generating the web image browsing screen 803 using the web part in the present exemplary embodiment will be described with reference to FIG. 14. The same reference numerals are applied to the steps including processing contents similar to the above-described steps, and detailed descriptions thereof will be omitted.

After the access control unit 301 transmits the web image browsing program to the client device 102 in steps S601 to S605 in order to display the web image browsing screen 803, in step S1400, the program execution unit 403 determines whether a web part information acquisition request is received. Specifically, the program execution unit 403 determines whether the user has pressed a button for executing the function of the web part in a web part execution screen (not illustrated). If receipt of the acquisition request cannot be determined (NO in step S1400), the processing proceeds to the display processing of the web image browsing screen in FIG. 9 described in the first exemplary embodiment. If receipt of the acquisition request can be determined (YES in step S1400), the processing proceeds to step S1401. Through the processing in step S1400, the processing is branched to the processing according to the first exemplary embodiment or the present exemplary embodiment.

In step S1401, the program execution unit 403 transmits the acquisition request of the web part information to the web server 101.

Figure 15:
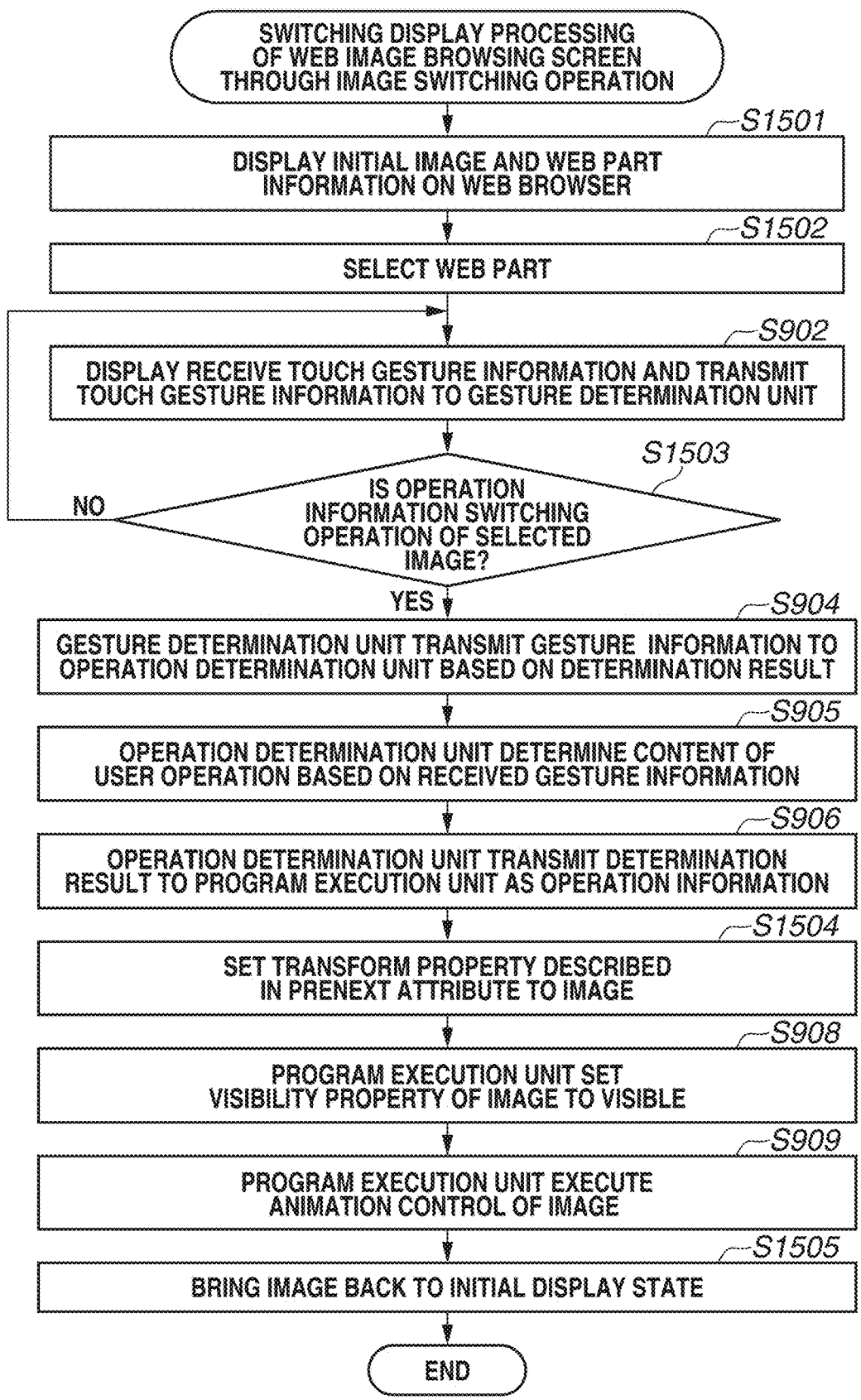
FIG. 15 is a flowchart illustrating switching display processing of the web image browsing screen executed through the image switching operation according to the second exemplary embodiment.

In step S1402, based on the image name included in the received request, the web server 101 specifies the web part information relating to the request target image in the related information database 304 via the data access unit 303. Then, in step S1403, the web server 101 transmits the specified web part information to the client device 102. After the client device 102 acquires the web part information, below-described switching display processing of the web image browsing screen 803 in FIG. 15 is executed through the image switching operation.

Figure 16A:
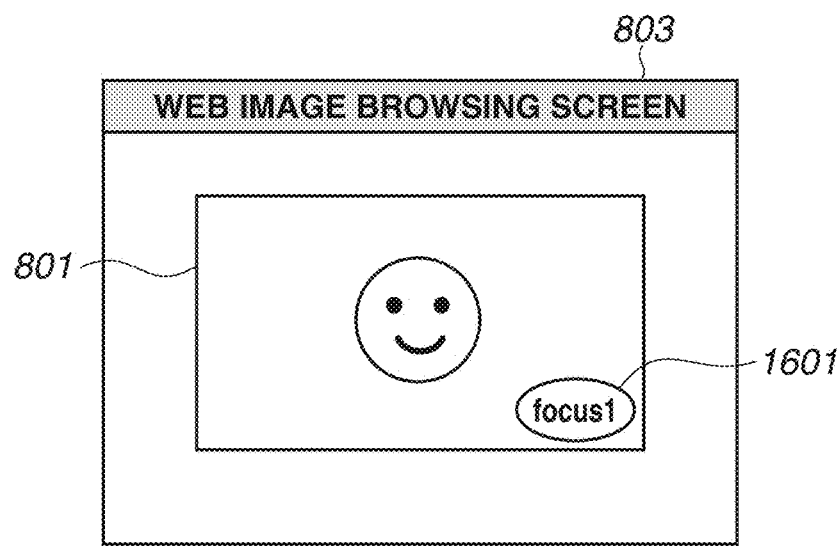
FIGS. 16A, 16B, and 16C are diagrams illustrating a web image browsing screen displayed on the web browser according to the second exemplary embodiment.
Figure 16B:
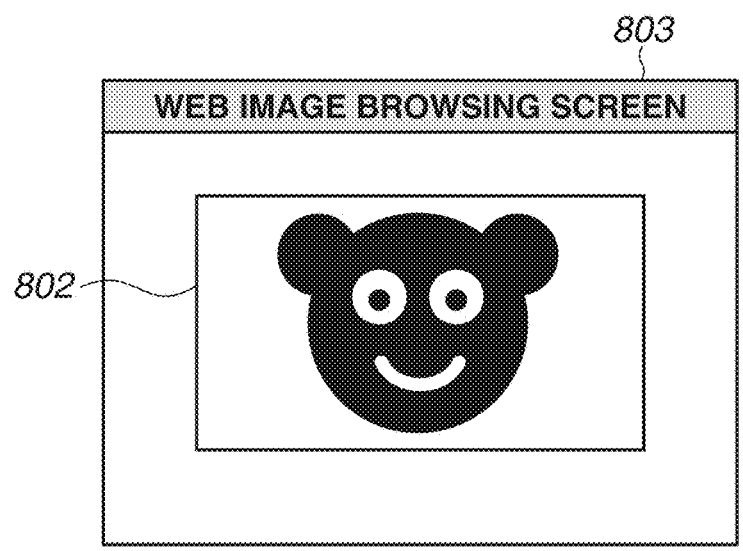
Figure 16C:
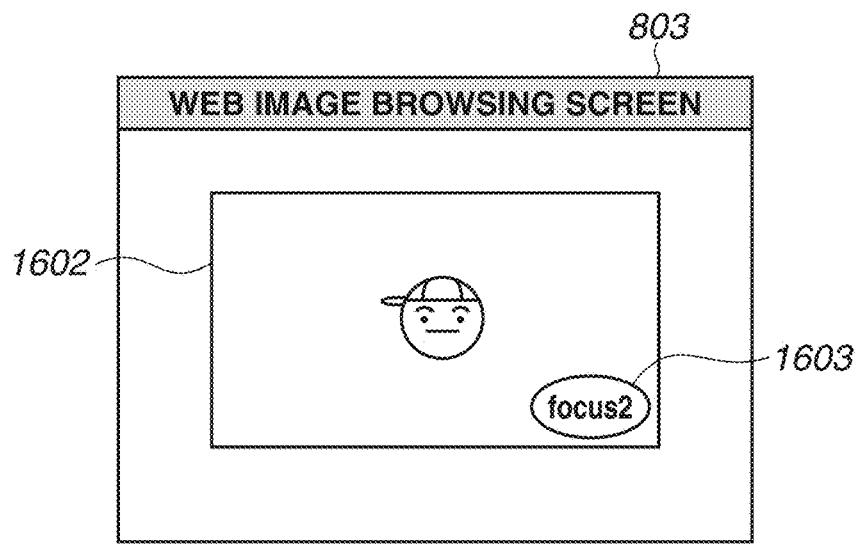

Next, switching display processing of the web image browsing screen 803 through the image switching operation will be described with reference to FIG. 15. After the program execution unit 403 receives the web part information from the web server 101 in step S1403, in step S1501, the program execution unit 403 displays the initial screen and the web part on the web browser 400. At this time, the image 801 as the initial image and a focus button 1601 as the web part are displayed on the web browser 400 in a state where the focus button 1601 is superimposed on the image 801. An example of the web image browsing screen 803 displayed on the web browser 400 in step S1501 is illustrated in FIG. 16A. In the present exemplary embodiment, it is assumed that the user can browse three images in the order of the images 801, 802, and 1602, and the images 801 and 1602 are previously registered as the execution targets of the focus mode. In FIGS. 16A and 16B, the images 801 and 1602 have not been enlarged yet by the focus mode.

After the initial image and the web part are displayed on the web browser 400, in step S1502, the web part is selected by the user. More specifically, the focus button 1601 is pressed by the user, so that the focus mode is activated.

In step S902, in a state where the focus mode is activated, the display 501 receives touch gesture information and transmits the touch gesture information to the gesture determination unit 401. In step S1503, the gesture determination unit 401 receives the touch gesture information and determines whether the touch gesture information is the image switching operation with respect to a selected image. The selected image is an image as an execution target of the function of the web part (the focus button). If the touch gesture information is the image switching operation (YES in step S1503), the processing proceeds to step S904. If the touch gesture information is not the image switching operation (NO in step S1503), the processing returns to the previous stage of step S902 where the display 501 can receive the tough gesture information.

After the gesture determination unit 401 determines that the touch gesture information is the image switching operation (YES in step S1503), then, in step S904, the gesture determination unit 401 transmits the gesture information to the operation determination unit 402 based on the determination result in step S1503. In this case, the gesture information is assumed to be "right swipe".

Figure 17A:
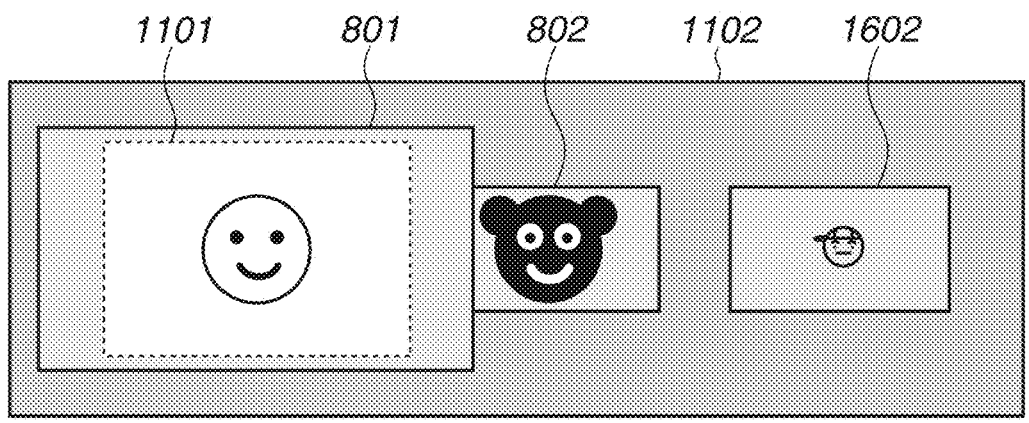
FIGS. 17A to 17I are conceptual diagrams illustrating arrangement of images in the display area and the non-display area according to the second exemplary embodiment.
Figure 17B:
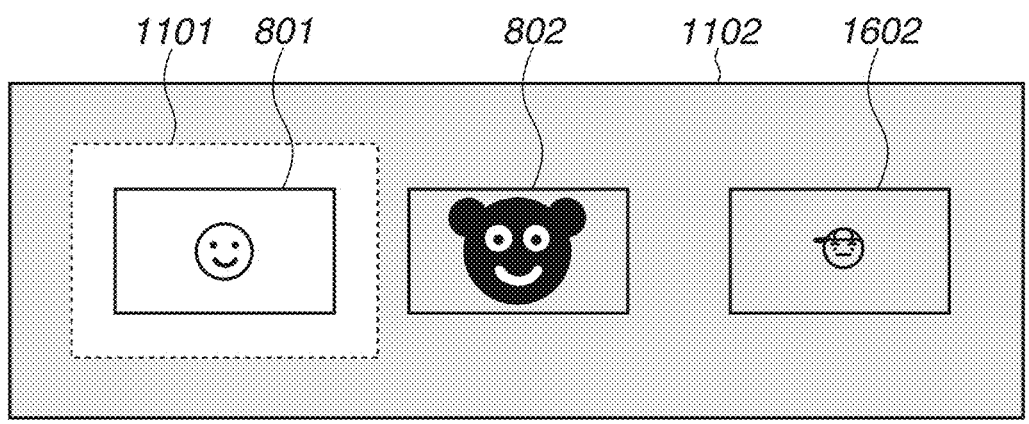

In step S905, the operation determination unit 402 determines the content of the user operation based on the received gesture information. In this case, it is assumed that the content of the user operation is determined as "operation of switching an image to a next selected image" because the gesture information is "right swipe". In step S906, the operation determination unit 402 transmits the determination result of step S905 to the program execution unit 403 as operation information. When the program execution unit 403 receives the operation information, the image 801 inside the display area 1101 is released from the focus mode and brought into a non-enlarged state (FIGS. 17A and 17B).

Figure 17C:
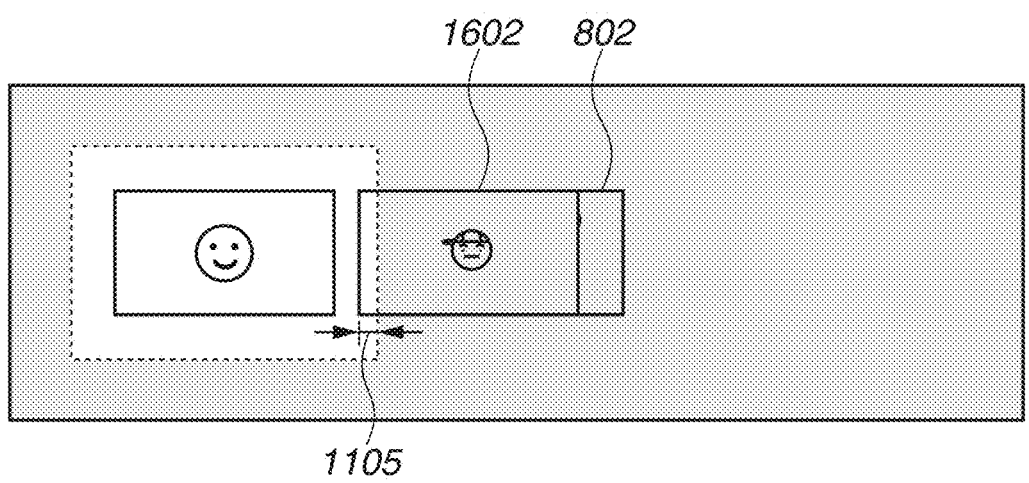

After the program execution unit 403 receives the operation information from the operation determination unit 402, then, in step S1504, the program execution unit 403 sets the transform property of an attribute 1801 described in the web image browsing program (FIG. 18) to the image 1602. In the attribute 1801, the transform property is set to "transform: translate3d (97%)", so that the image 1602 is moved to a position corresponding to "97%" of the display area 1101. At this time, because the image 802 that is not a selected image is not moved, the images 1602 and 802 are partially superimposed and arranged in the non-display area 1100 (FIG. 17C).

Figure 17D:
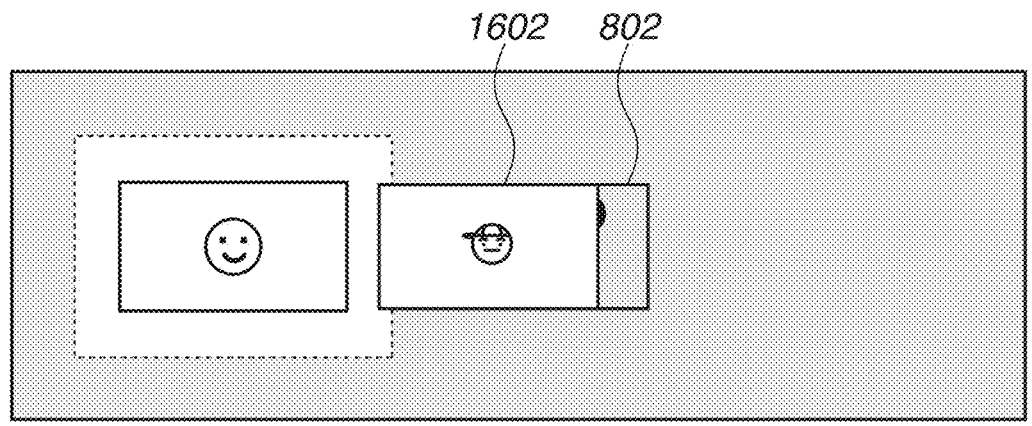
Figure 17E:
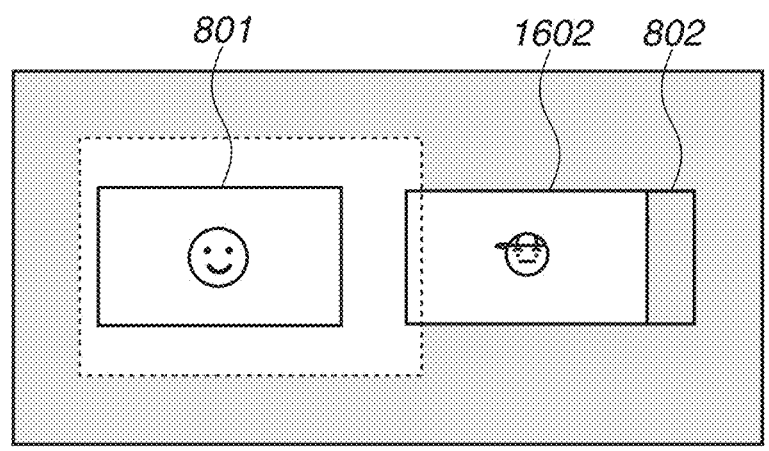
Figure 17F:
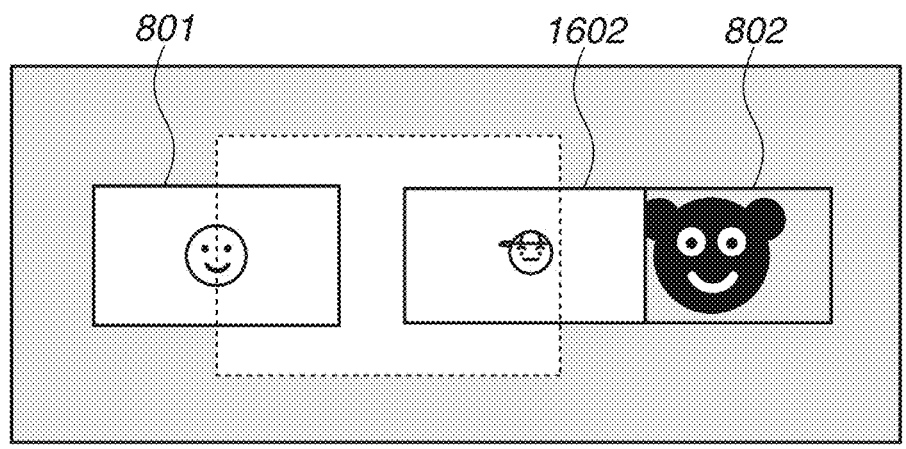
Figure 17G:
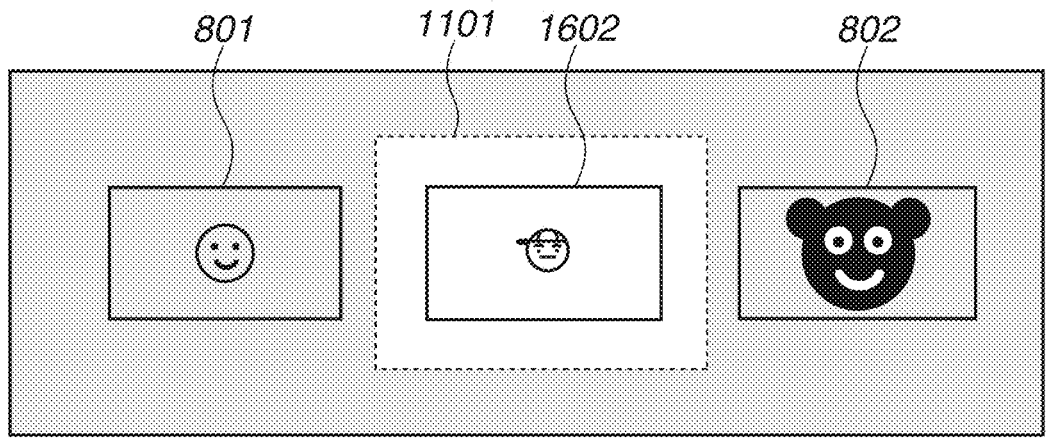
Figure 17H:
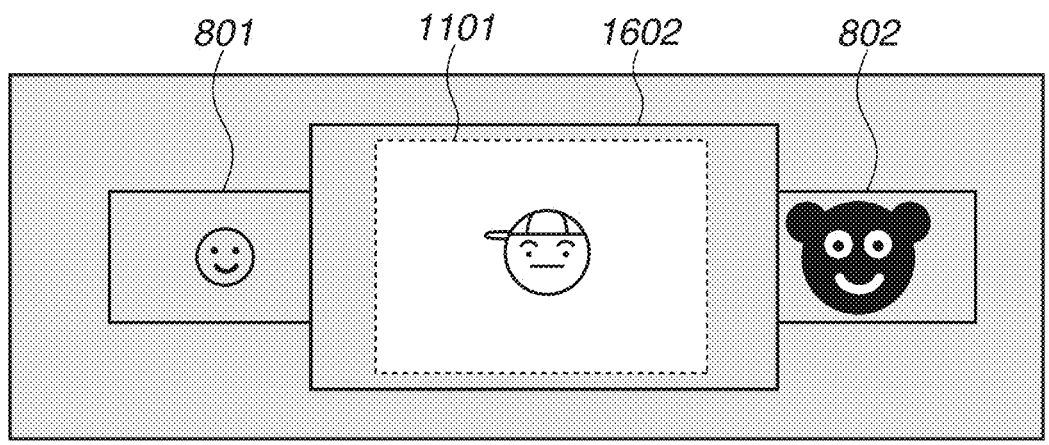
Figure 17I:
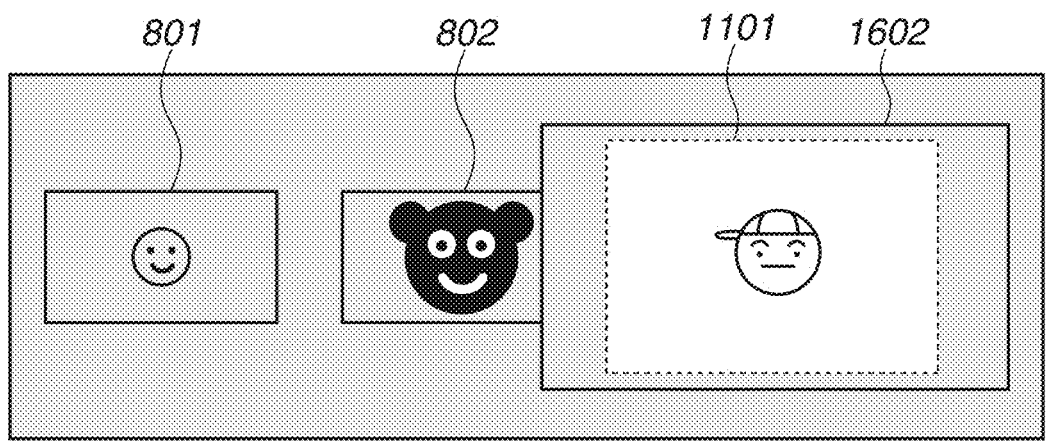

After the attribute 1801 (FIG. 18) is set to the selected image (image 1602) in step S1504, then, in step S908, the visibility property of the image 1602 is set to "visible". A conceptual diagram of the display screen in this state is illustrated in FIG. 17D. Based on the content of the web image browsing program (FIG. 18), the program execution unit 403 executes animation control of the images 801 and 1602. More specifically, in step S909, an attribute 1802 is set to the image 801, and an attribute 1803 is set to the image 1602. As a result, fade-out animation of the image 801 and fade-in animation of the image 1602 are executed on the web image browsing screen 803. An example of a state where the displayed images are shifted is illustrated in FIGS. 17G and 17H. The image 1602 is not enlarged until the animation operation ends (FIGS. 17A to 17G), and the image 1602 is enlarged by the focus mode after the animation operation ends (FIGS. 17H and 17I). The details will be described below with reference to FIG. 19.

After the image 1602 is moved to the display area 1101 in step S909, in step S1505, the program execution unit 403 returns the order of the images to the initial order. The initial order of the images is the order of images illustrated in FIG. 17A, and the images 801, 802, and 1602 are arranged in the display area 1101 or the non-display area 1100 in that order. More specifically, the program execution unit 403 applies the attribute 1804 of the web image browsing program (FIG. 18) to the image 801 and applies the attribute 1802 to the image 802, so that arrangement of the respective images returns to the initial order. An example of the arrangement of the images in that state is illustrated in FIG. 17I. Through the above-described processing, if display of the images is switched through the image switching operation after the user has pressed the focus button 1603 to release the focus mode in FIG. 17I, the image 802 arranged ahead of the image 1602 is displayed in the display area 1101, so that the images can be sequentially browsed through the image switching operation as with the case of the first exemplary embodiment. In other words, arrangement of the images is brought into the state in FIG. 17I, which enables the user to release the focus mode to brows the images in a normal order.

In the present exemplary embodiment, respective properties of the attribute 1802 applied to the image 802 are described as "transition: 1.0 s ease" and "visibility: visible", and the image 802 is animated to pass across the display area 1101 when the image 802 is moved from the third position (FIG. 17H) to the second position (FIG. 17I). However, the image 802 in a moving state is not displayed on the web image browsing screen 803. Because the pre-moved image 802 is arranged in the non-display area 1100 (FIG. 17H), the image 802 is "invisible" regardless of the setting value of the visibility property of the attribute 1804. Because the visibility property remains "invisible" when the image 802 is moved by the animation, the image 802 passing across the display area 1101 is not displayed on the web image browsing screen 803.

The above-described exemplary embodiment is not seen to be limiting, and the image 802 can be instantaneously moved to the second position in the arrangement without being animated by, for example, deleting the description of "transition".

Figure 19:
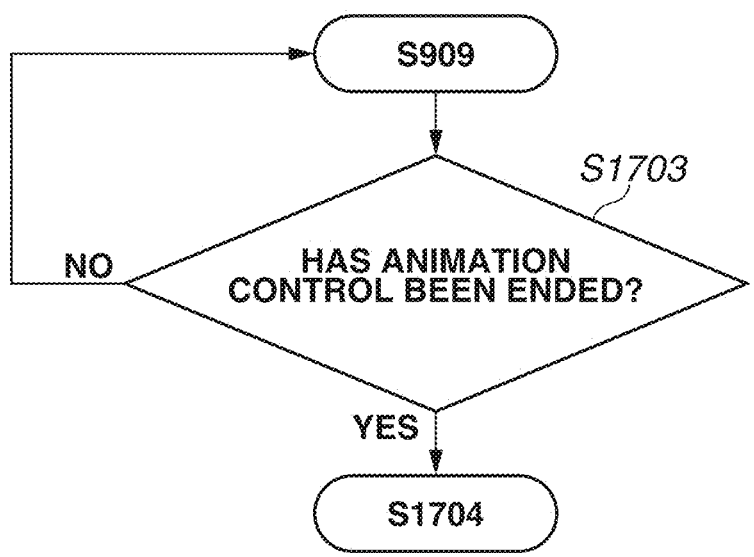
FIG. 19 is a flowchart illustrating processing of controlling a focus mode with respect to images according to the second exemplary embodiment.

Next, processing of controlling the focus mode with respect to the images 801 and 1602 in step S909 (FIG. 15) will be described with reference to FIG. 19.

After animation control is executed in step S909, in step S1703, the program execution unit 403 determines whether the animation control has ended. If the program execution unit 403 determines that the animation control has ended (YES in step S1703), the processing proceeds to step S1704. In step S1704, the program execution unit 403 executes the function of the web part with respect to the target image. In the present exemplary embodiment, the function of the web part is the focus mode. Specifically, the image 1602 is moved to the display area 1101 via the animation control, and when the animation control ends, the image 1602 is enlarged by the focus mode (FIG. 17H).

With respect to the image 801, the image 801 can be moved to the non-display area 1100 through the animation control before or after execution of the focus mode is ended. The former example is illustrated in FIGS. 17A to 17I.

In the present exemplary embodiment, while a state where the image 802 as one non-selected image is arranged between the selected images 801 and 1602 associated with the web part information has been described with reference to FIGS. 17A and 17H), more than one non-selected images can be arranged therebetween.

According to the present exemplary embodiment, even if the focus mode is being executed, the image can be switched to a related image using animation through the image switching operation, so that the user can intuitively recognize that the image is switched to the desired image.

OTHER EMBODIMENTS

The image or the selected image described in the above exemplary embodiment is an image of any one of or a combination of a document, a photograph, a chart, a graph, or a picture, and a part of the image can be displayed on the screen. While the cases in which just one image is browsed and displayed on the web image browsing screen 803 have been described, a plurality of images can be concurrently browsed and displayed thereon, and pre-registration for executing the focus mode can be performed with respect to each of the images placed in one page.

In the above-described exemplary embodiments, when an image A is moved to the non-display area 1100 from the display area 1101 and an image B is moved to the display area 1101 from the non-display area 1100 (i.e., the state illustrated in FIG. 11B in the first exemplary embodiment and the state illustrated in FIG. 17B in the second exemplary embodiment), the images A and B may or may not be partially superimposed with each other in the display area 1101. The images A and B can be superimposed in the midst of switching the image A to the image B if one or both of the images A and B are large in size.

In the above-described exemplary embodiments, while the image is animated and moved by using the CSS property, a moving method of the image position is not limited thereto, and the image can be moved by the JavaScript™ program.

In the above-described exemplary embodiments, while fade-out animation of the image 801 and fade-in animation of the image 802 are executed simultaneously, the fade-out animation and fade-in animation can be started at different timings. For example, after fade-out animation of the image 801 is started, fade-in animation of the image 802 can be started by setting a visibility property of the image 802 to "visible".

In the first and the second exemplary embodiments, switching display of images executed by the swipe operation has been described as an example, but the method of operation is not limited to the swipe operation. For example, scaling control can be executed by a pinch operation, and rotation control can be executed by a rotation operation. With respect to the focus mode described in the second exemplary embodiment, a method of starting or releasing the focus mode and a method of switching the image to the selected image during the focus mode is not limited to the above-described methods, and any content of the operation regarded as a trigger to the start or release of the focus mode or switch of the image to the selected image can be appropriately employed. For example, the image 801 can be brought into an execution preparation state of the focus mode when the user presses the focus button 1601, and enlarged only when the user performs double-tap on the image 801. Then, the image 801 can be returned to the original non-enlarged state and brought into the execution preparation state of the focus mode when the user performs double-tap on the image 801 again.

In the above-described exemplary embodiments, while the cases in which the visibility property is set to "visible (visible state)" or "invisible (invisible state)" has been described as an example, other properties such as "visible (displayed state)" and "hidden (non-displayed state)" can be also used.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125529, filed Jun. 27, 2017, which is hereby incorporated by reference herein in its entirety.

What is claimed is:

1. A method for a device that provides content for a web browser, wherein the web browser executes a display process based on the content, the method comprising:
providing web content,
wherein the web content includes a program for changing a display property of an image, which has been set to a first setting value associated with an invisible state by the web browser, from the first setting value to a second setting value associated with a visible state, based on an edge of the image being moved to a display area having moved to a predetermined position in an area at a first edge of the display area, the edge of the image being a front edge of the image being moved in a direction from the first edge of the display area to a second edge of the display area, and
wherein the image enters the display area in a non-display state, is maintained in the non-display state until the image is moved to the predetermined position, turns into a display state, and is moved in the display area in the display state by the program.

2. The method according to claim 1, wherein the web content includes Cascading Style Sheets (CSS) or JavaScript containing a description for changing the display property of the image to the visible state.

3. The method according to claim 1, wherein the web browser sets a display property of an image that is not included in the display area to an invisible state.

4. The method according to claim 3, wherein, in a case where the image is moved from an area outside the display area to the display area in response to a user operation for switching a display image, the web browser moves the image to the display area in the non-display state in accordance with the set invisible state and maintains the non-display state until the image to be moved is moved to the predetermined position in the display area.

5. The method according to claim 1, wherein the web content includes a program for setting a display property of an image that is partially included in the display area.

6. The method according to claim 1, wherein the program is a program for changing the display property from the first setting value to the second setting value after the image to be moved is moved to the display area such that the image is partially included in the display area.

7. The method according to claim 1, wherein the image to be moved is an image in a scalable vector graphics (SVG) format.

8. The method according to claim 1, wherein the web content includes the image to be moved.

9. The method according to claim 1, wherein the web browser provided with the web content displays an animation until the image is moved from the area outside the display area to the display area.

10. The method according to claim 1,
wherein when a next image is displayed in the display area, the web content defines an attribute to be applied when a part of the next image is included in the display area, and
wherein the display property of the image set to the invisible state by the web browser is changed to the visible state in accordance with the defined attribute, based on the edge of the image being moved to the predetermined position in the area at the first edge of the display area.

11. The method according to claim 10, wherein the web content defines attributes of an image before an image displayed in the display area, an image next to the image displayed in the display area, and an image to be displayed in the display area.

12. The method according to claim 1, wherein the first edge is a right side of the display area and the second edge is a left side of the display area.

13. A device that provides content for a web browser, wherein the web browser executes a display process based on the content, the device comprising:
a memory storing instructions; and
at least one processor in communication with the memory, where when the at least one processor executes the instructions, the at least one processor functions as:
a web server which provides web content,
wherein the web content includes a program for changing a display property of an image, which has been set to a first setting value associated with an invisible state by the web browser, from the first setting value to a second setting value associated with a visible state, based on an edge of the image being moved to a display area having moved to a predetermined position in an area at a first edge of the display area, the edge of the image being a front edge of the image being moved in a direction from the first edge of the display area to a second edge of the display area, and
wherein the image enters the display area in a non-display state, is maintained in the non-display state until the image is moved to the predetermined position, turns into a display state, and is moved in the display area in the display state by the program.

14. A non-transitory computer-readable storage medium storing instructions that, when executed by one or more processors, controls the one or more processors to cause a device that provides content for a web browser, wherein the web browser sets a display property of an image to an invisible state, the method comprising:
providing web content,
wherein the web content includes a program for changing a display property of an image, which has been set to a first setting value associated with an invisible state by the web browser, from the first setting value to a second setting value associated with a visible state, based on an edge of the image being moved to a display area having moved to a predetermined position in an area at a first edge of the display area, the edge of the image being a front edge of the image being moved in a direction from the first edge of the display area to a second edge of the display area, and
wherein the image enters the display area in a non-display state, is maintained in the non-display state until the image is moved to the predetermined position, turns into a display state, and is moved in the display area in the display state by the program.

* * * * *